Nov. 17, 1925. 1,561,467
F. HEDLEY ET AL
MULTIPLE UNIT DOOR CONTROL SYSTEM FOR CARS
Filed July 1, 1919 14 Sheets-Sheet 1
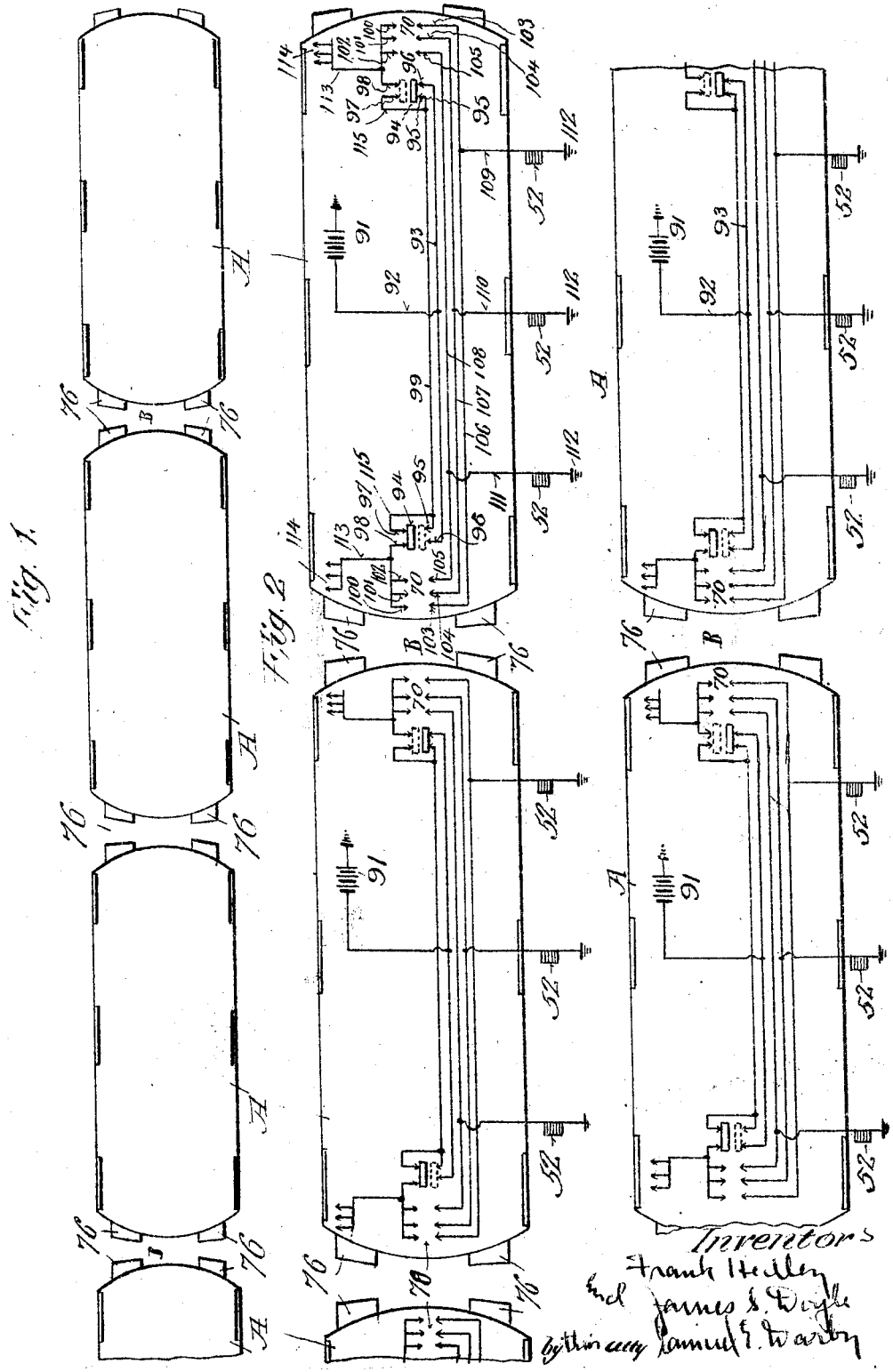

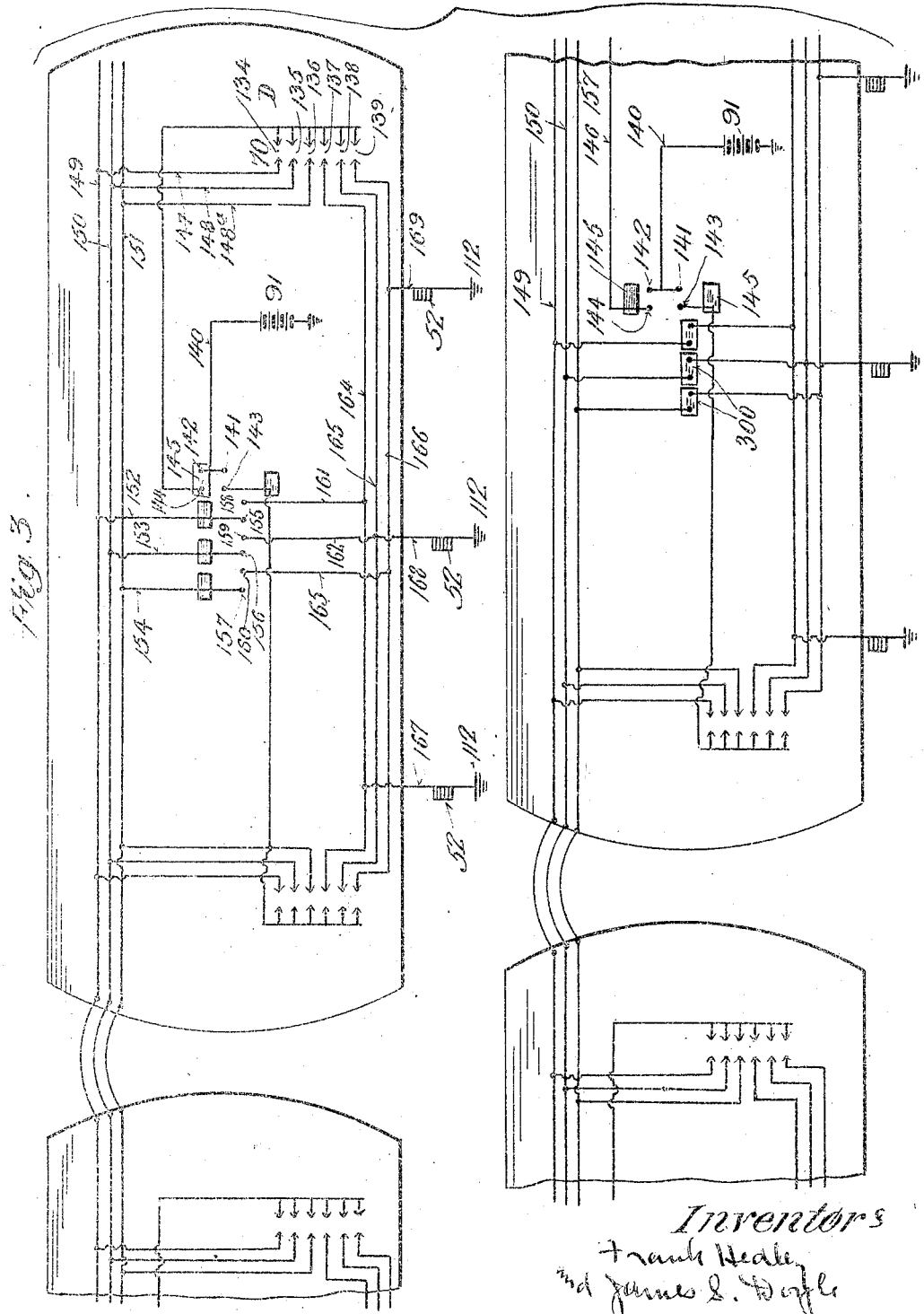

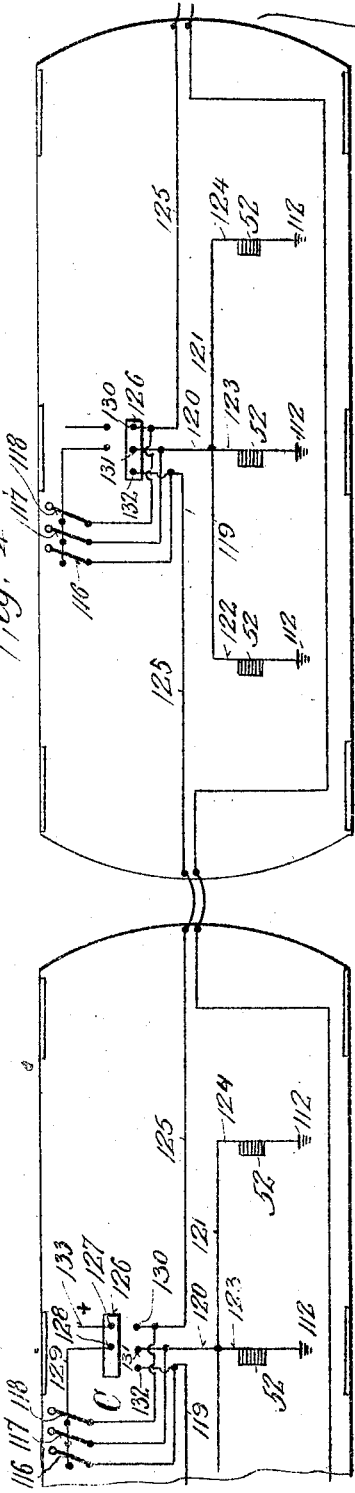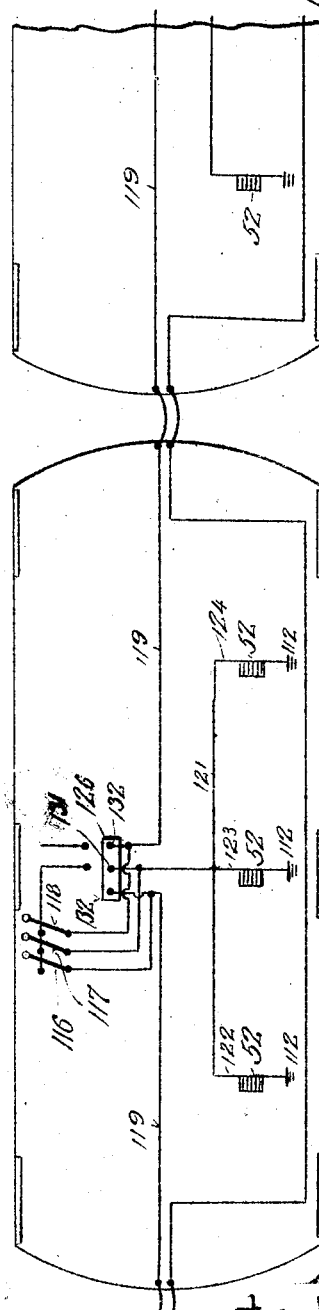

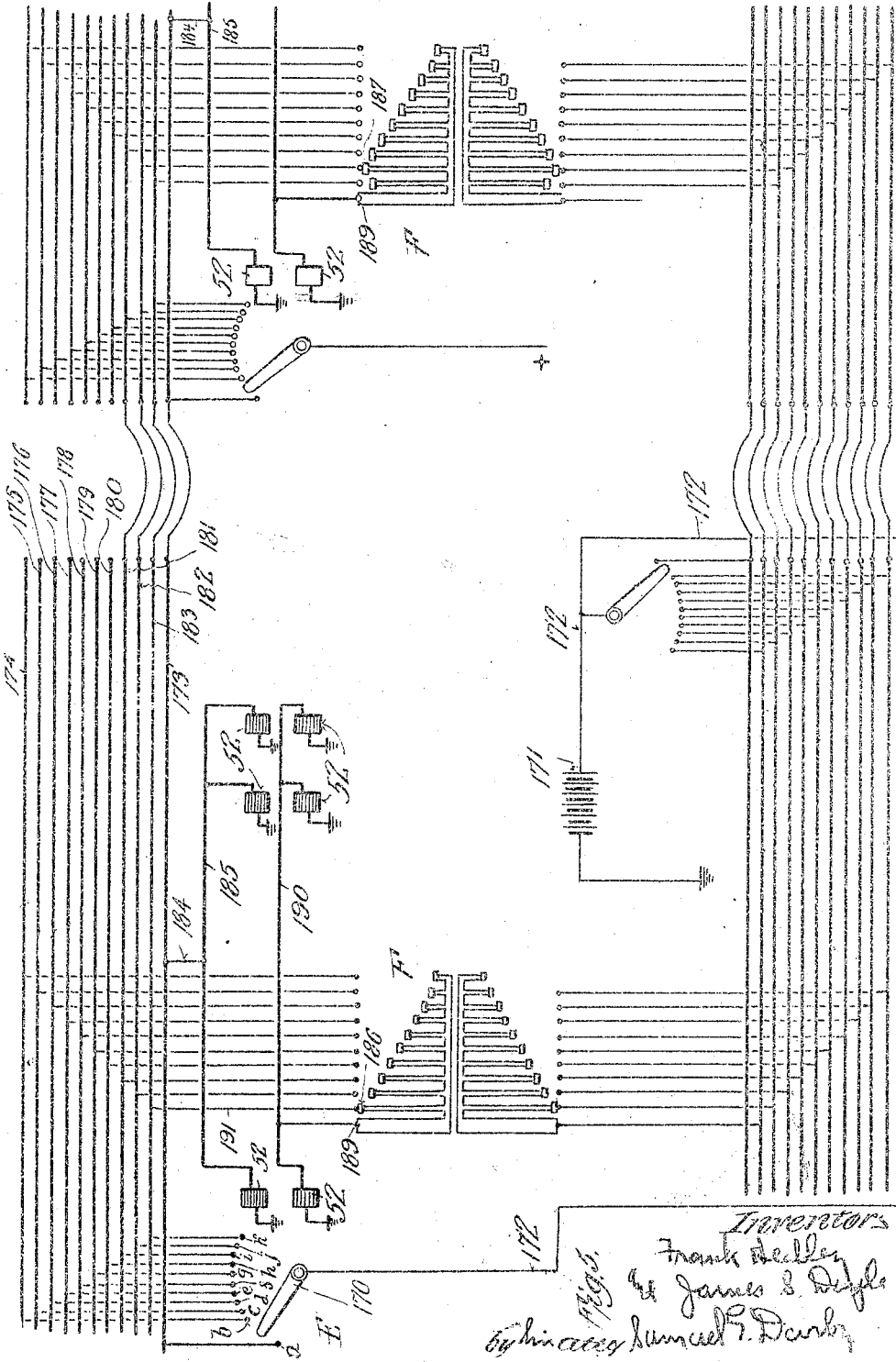

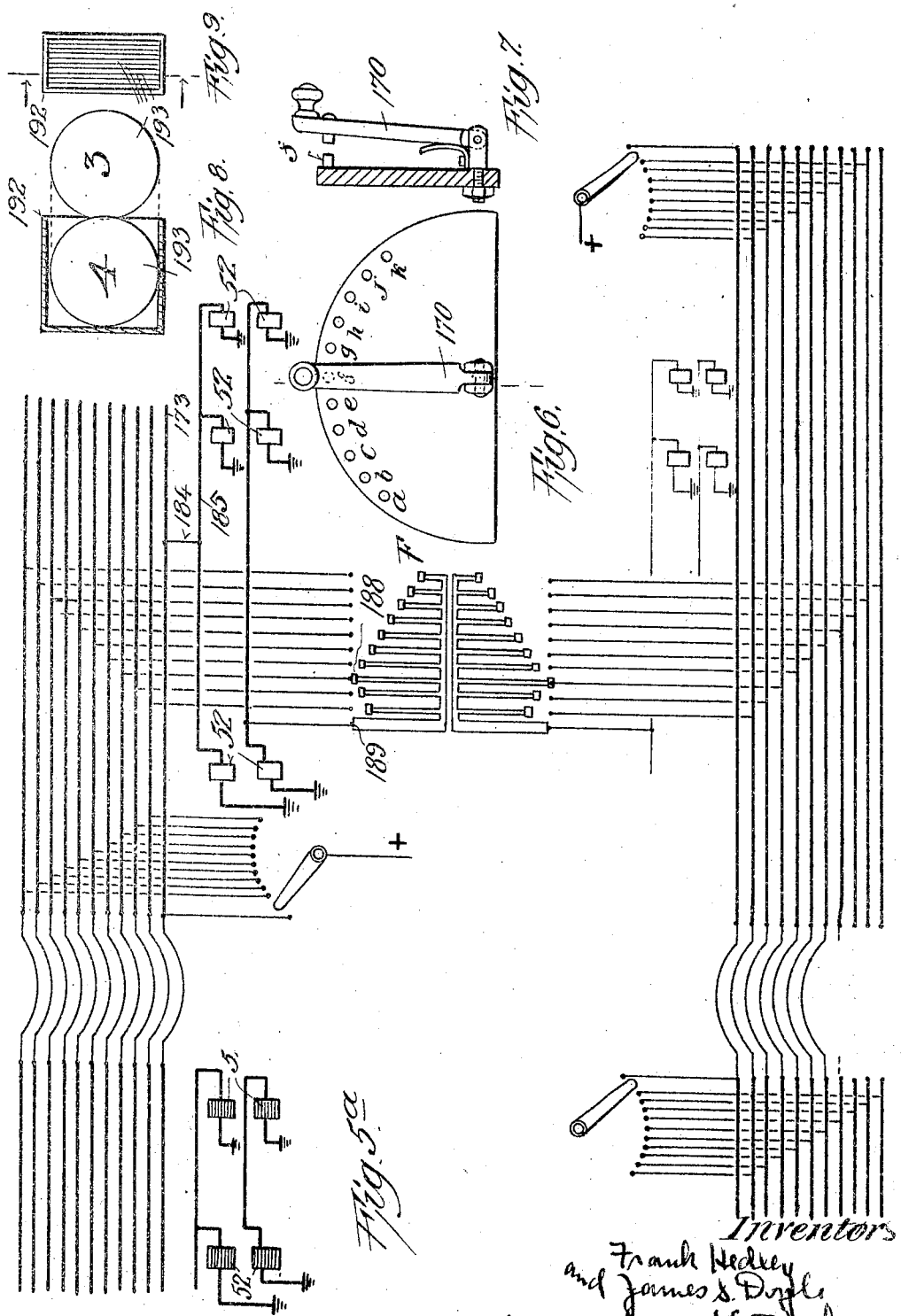

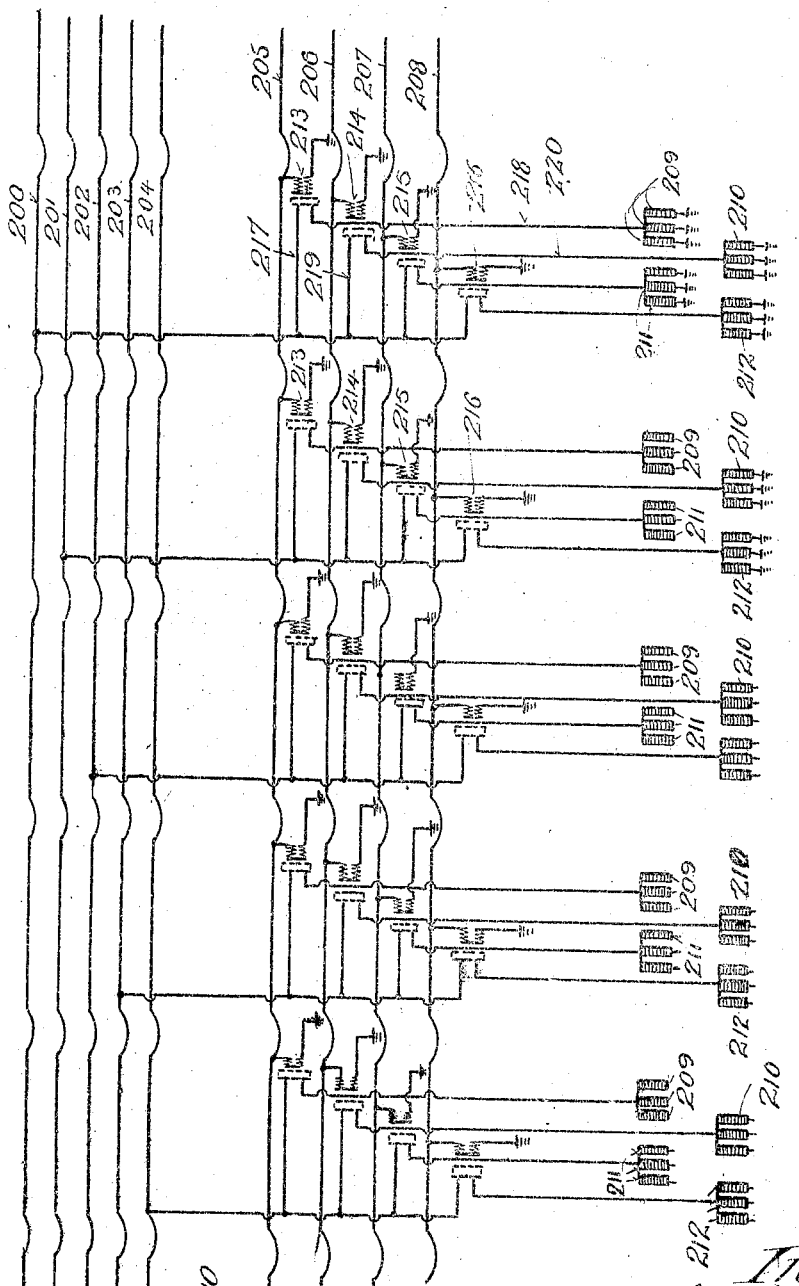

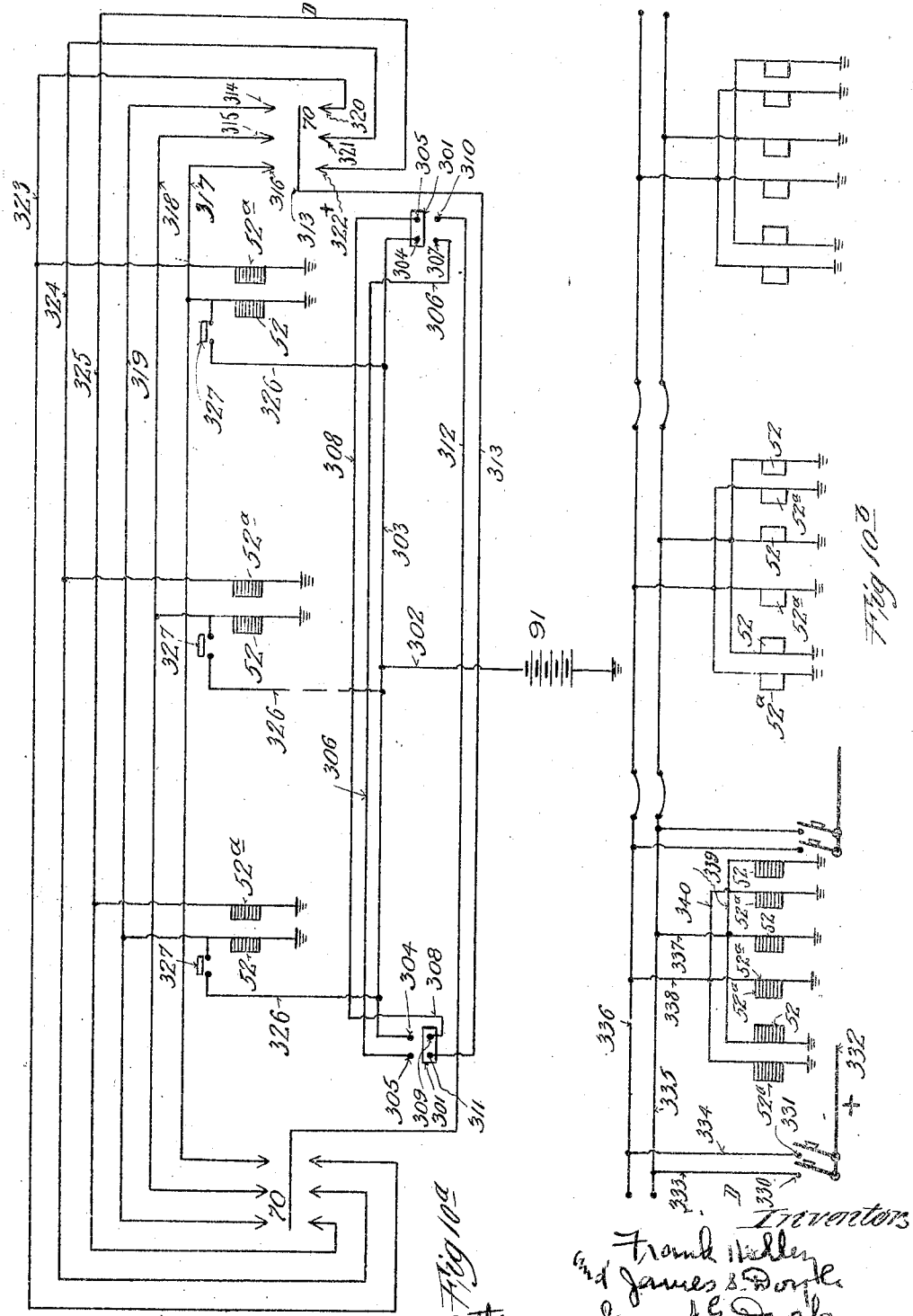

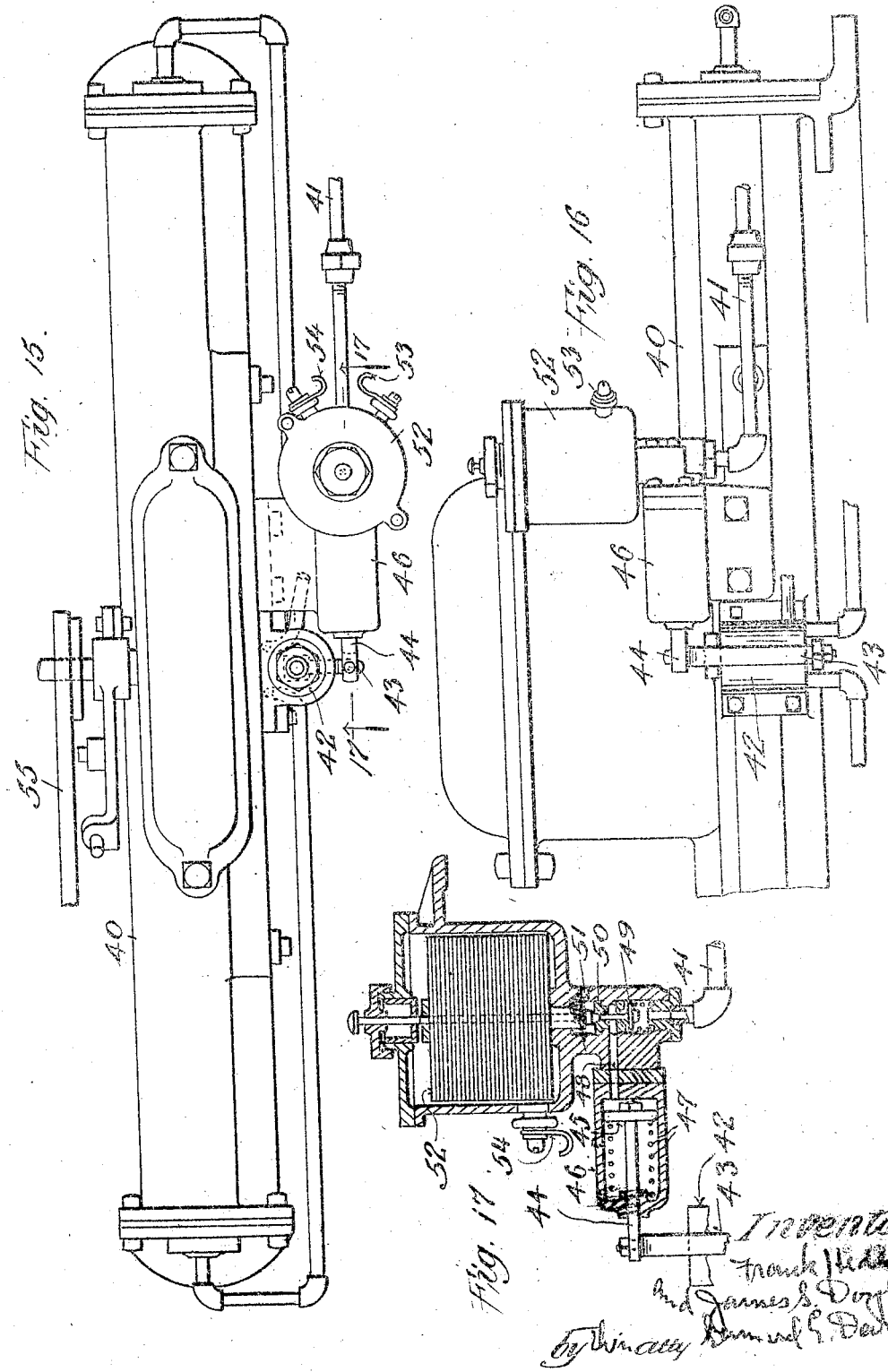

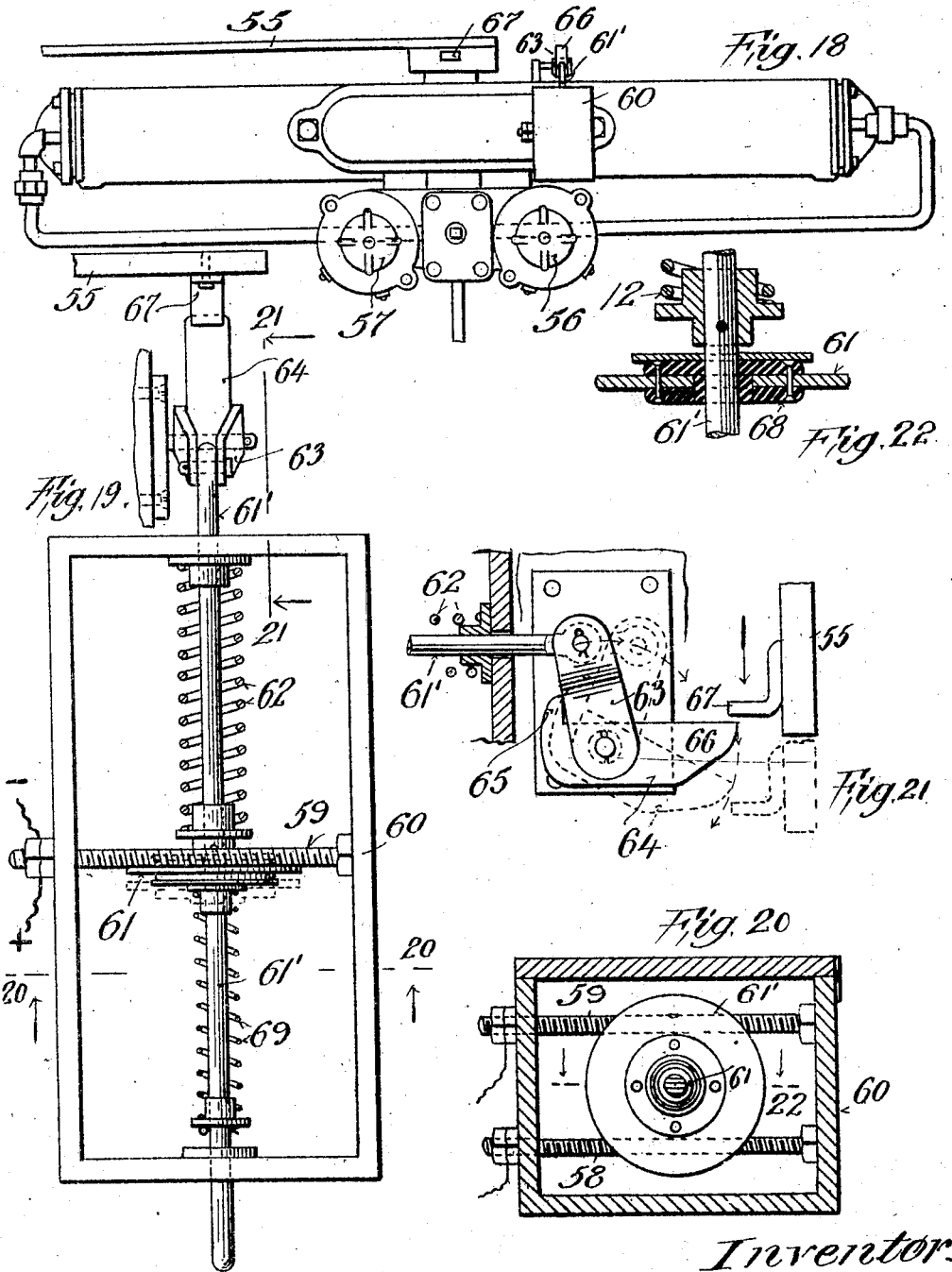

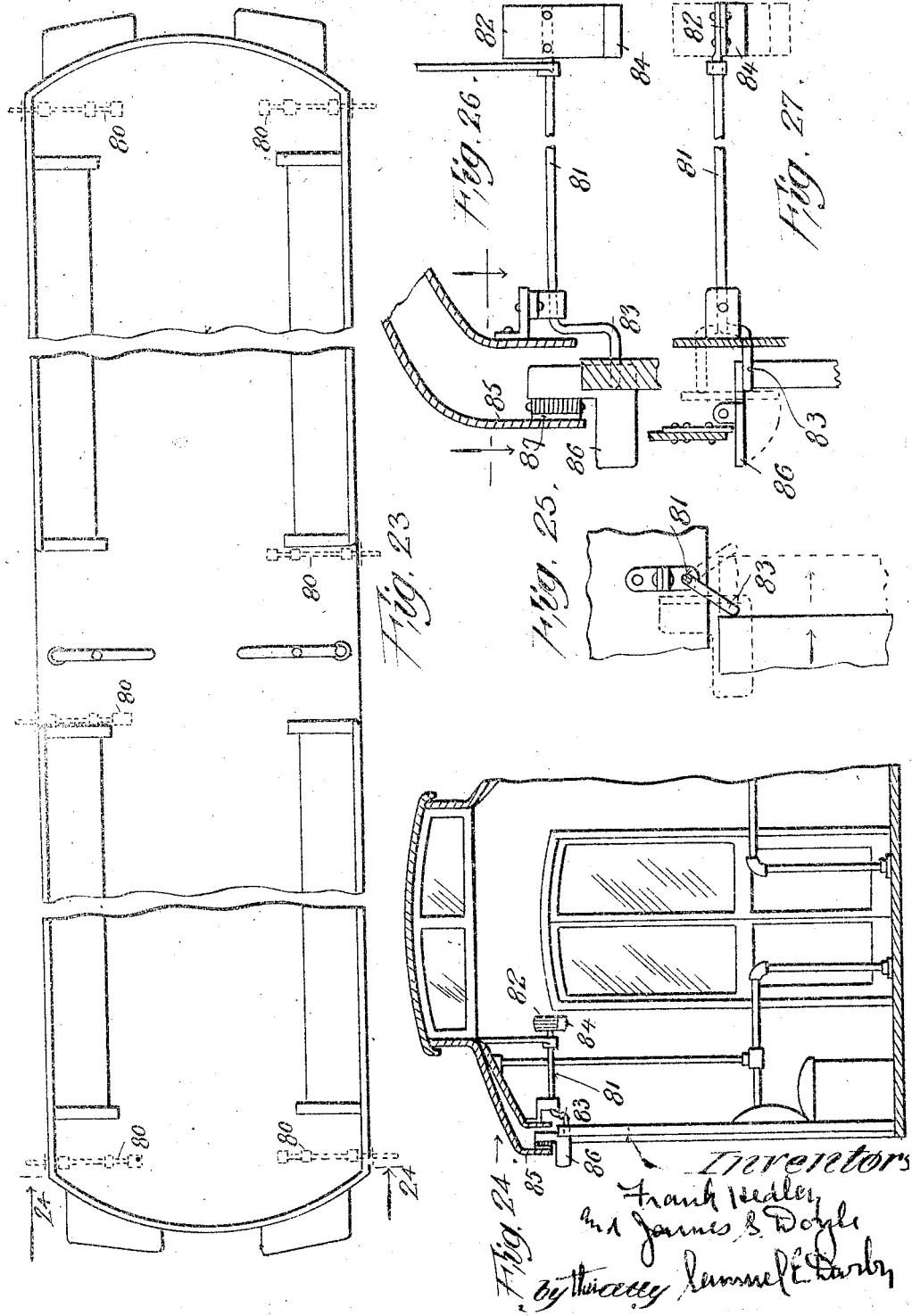

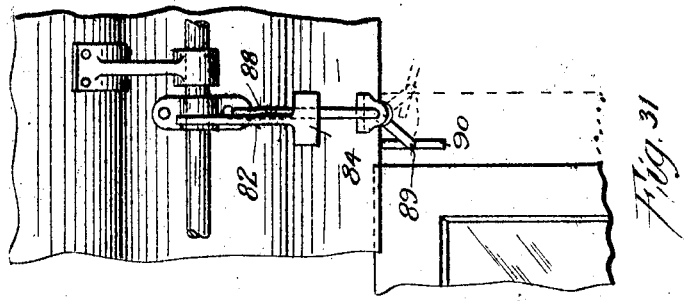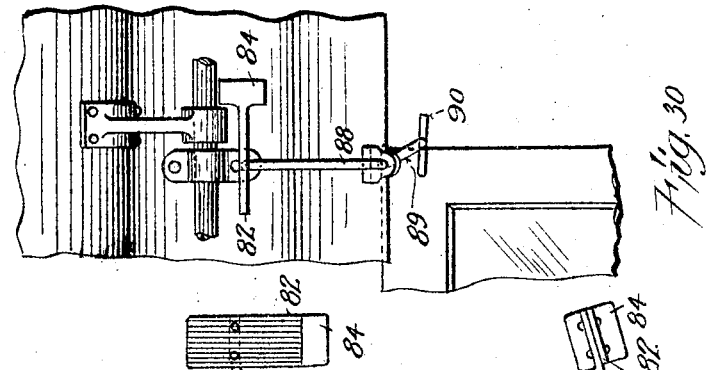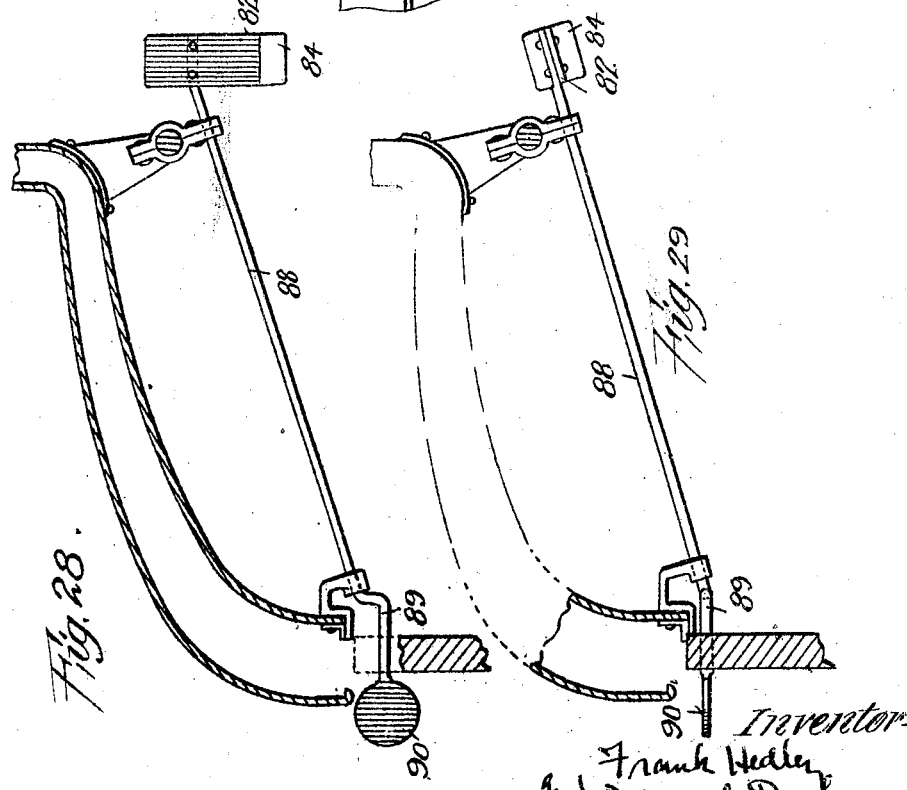

Nov. 17, 1925.
F. HEDLEY ET AL
1,561,467
MULTIPLE UNIT DOOR CONTROL SYSTEM FOR CARS
Filed July 1, 1919 14 Sheets-Sheet 13
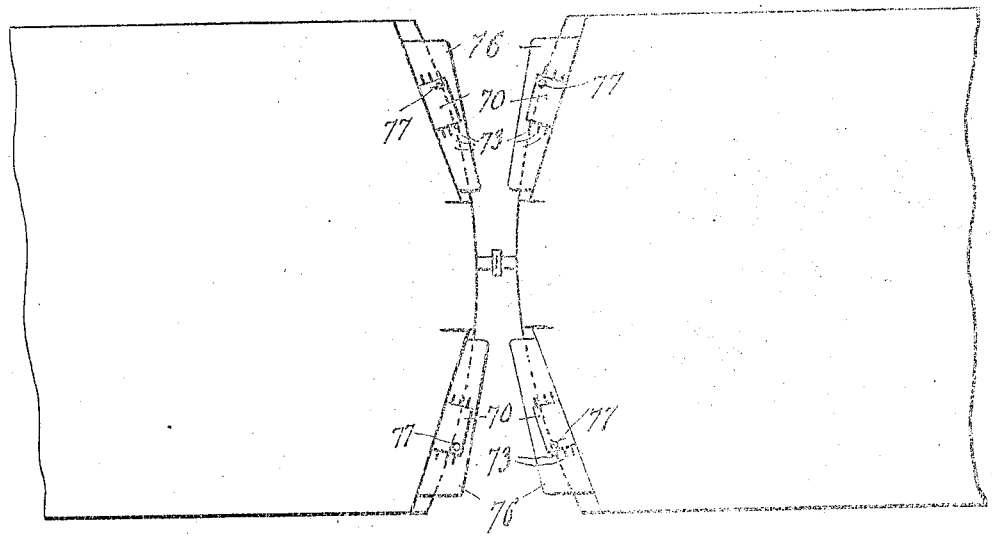
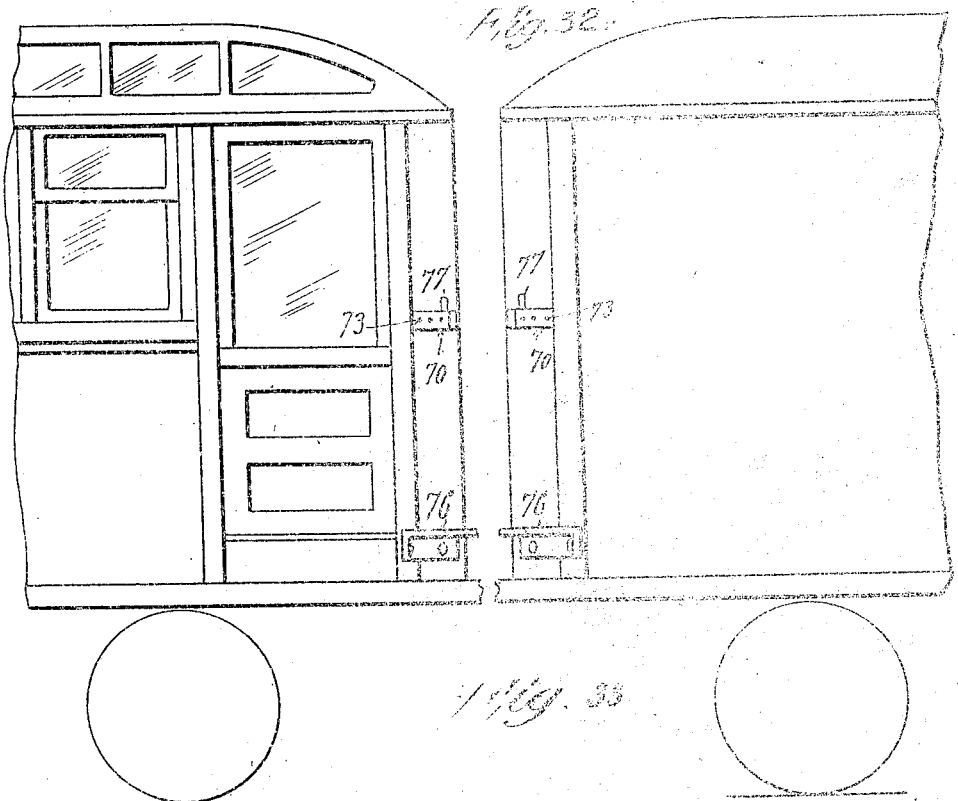

Patented Nov. 17, 1925.

1,561,467

UNITED STATES PATENT OFFICE.

FRANK HEDLEY, OF YONKERS, AND JAMES S. DOYLE, OF MOUNT VERNON, NEW YORK.

MULTIPLE-UNIT DOOR-CONTROL SYSTEM FOR CARS.

Application filed July 1, 1919. Serial No. 307,897.

*To all whom it may concern:*

Be it known that we, FRANK HEDLEY and JAMES S. DOYLE, both citizens of the United States, and residents, respectively, of Yonkers and Mount Vernon, county of Westchester, State of New York, have made a certain new and useful Invention in Multiple-Unit Door-Control Systems for Cars, of which the following is a specification.

This invention relates to door control systems, and more particularly to multiple unit door control systems for cars.

The object of the invention is to simplify the operation and control of the doors of cars in a train of cars, and to reduce the cost of operation of car or train systems.

A further object is to provide a door control system for cars wherein the control of the doors is effected in multiple units of the cars of the train.

A further object is to provide a door control for cars in a train wherein the control of doors on two or more cars of the train is effected from a single station.

A further object is to provide a door control arrangement wherein both the opening and closing movements of the doors, in a multiple unit control system, are controlled from the control station.

A further object of the invention is to provide a multiple unit control system of the nature referred to wherein selective control is accomplished of the various doors on any particular car of the train.

A further object is to provide a door control system of the nature referred to wherein selective control is accomplished of the particular car on which the doors are to be operated.

A further object of the invention is to provide indicating devices, controlled coincidently with the door operations in a multiple unit car door control system to indicate to an operator at a control point or station whether the doors or any one or more of them, are open or closed.

A further object of the invention is to provide means at a station or control in a multiple unit car door control system to constitute a platform or support for the operator in such relation as to enable the operator to observe the boarding and alighting movements of passengers, and the door operations from a point either inside or outside the car or train.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Refering to the drawings:

Fig. 1 is a view in diagram outline of a train of four cars, and indicating the door control stations between two pairs of the cars of the train.

Fig. 2 is a similar view illustrating a wiring diagram suitable for use in a door control system embodying our invention for multiple unit operation of the cars of a train, as applied where the operation of the individual doors on each car is selectively controlled, and only one magnet is employed to control both the opening and the closing movements of each door operating motor.

Fig. 3 is a similar view illustrative of a wiring arrangement for a selective door control in a multiple unit system on a four car train.

Fig. 4 is a similar view of a wiring arrangement for simultaneous operation of all the doors on any particular car and selectivity of the particular car one which the doors are to be operated.

Figs 5 and 5ª are diagrams of another circuit wiring for a multiple unit door control system embodying the principles of our invention wherein all the doors of any particular car are simultaneously controlled from the control station in the multiple unit control system, and employing separate magnets for controlling the opening and closing of each door.

Fig. 6 is a detail view of a form of control switch suitable for use in connection with the arrangement shown in Figs. 5 and 5ª.

Fig. 7 is a similar view in side elevation of the switch shown in Fig. 6.

Fig. 8 is a detail view in side elevation of a car indicator device suitable for use in operating the drum or car switch employed in connection with the arrangement shown in Figs. 5 and 5ª.

Fig. 9 is a view in front elevation of the same.

Fig. 10 is a diagrammatic view of another form of wiring arrangement of a multiple unit car door control system embodying our invention.

Fig. 10ª is a diagrammatic view of another circuit arrangement embodying our invention wherein separate magnets are employed to control the opening and closing movements of the doors, and selectivity of control as to the particular door to be operated is secured.

Fig. 10ᵇ is a similar view showing an arrangement for simultaneously opening and simultaneously closing all the doors on either side of the train.

Figure 11:
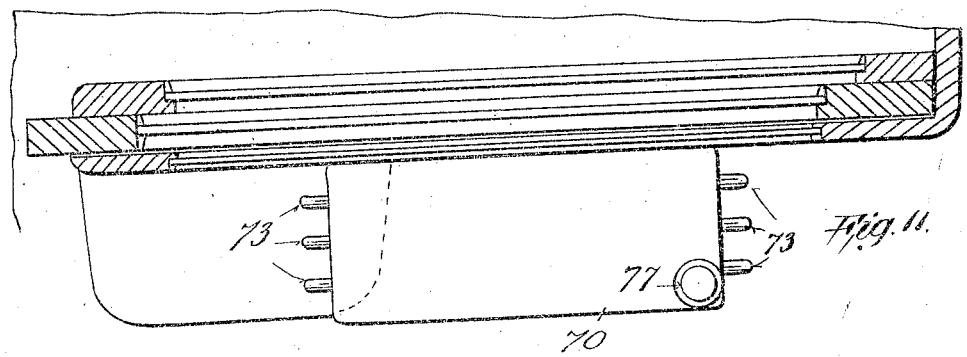

Fig. 11 is a view in top plan of a door operating circuit control box and operator's arm rest and grab at a control station, a portion of the end of the car being shown in horizontal section.

Figure 12:
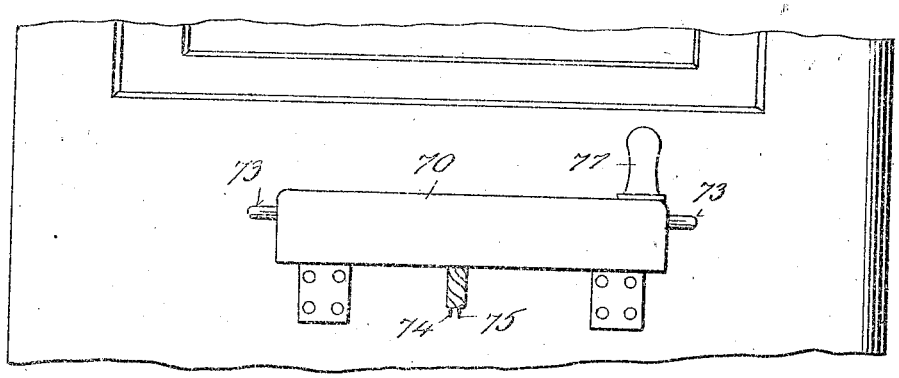

Fig. 12 is a front elevation of the same.

Figure 13:
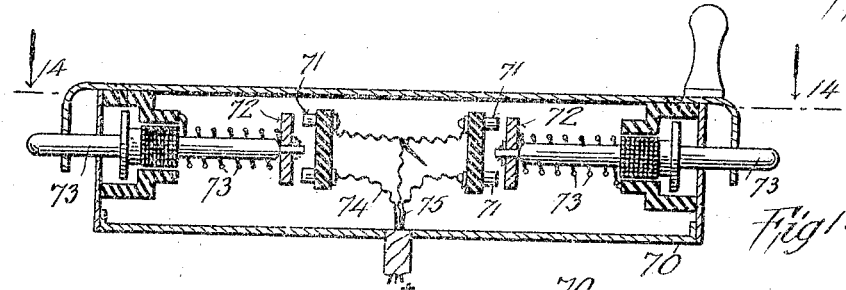
Figure 14:
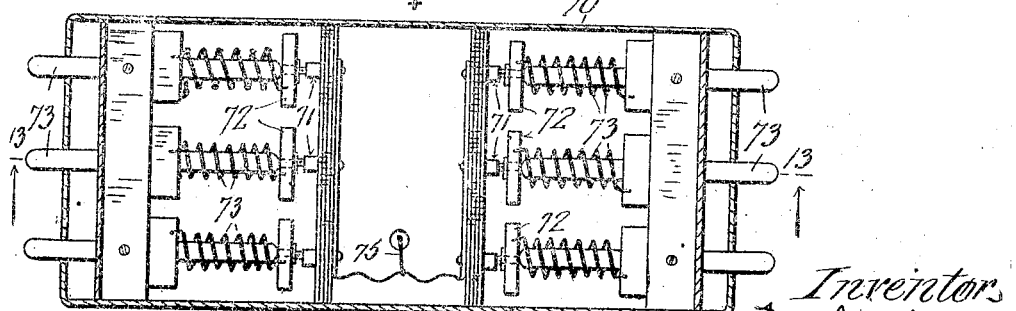

Fig. 13 is a view in vertical longitudinal section through the control box, on the line 13, 13, Fig. 14, looking in the direction of the arrows.

Fig. 14 is a horizontal view in section of the same, on the line 14, 14, Fig. 13, looking in the direction of the arrows.

Fig. 15 is a view in top plan of a door operating motor showing a single control magnet for both the opening and closing movements of each door.

Fig. 16 is a front elevation of the construction shown in Fig. 15.

Fig. 17 is a detail view in section of the control magnet and valve employed in connection with the motor shown in Figs. 15 and 16.

Fig. 18 is a top plan view of a door operating motor showing independent magnets for controlling the opening and closing movements of the door.

Fig. 19 is a detail view in top plan of an automatic switch device for controlling the circuit of the magnet employed in connection with the closing movements of the doors, the switch device being shown in its closed position corresponding to the dotted line position of the parts shown in Fig. 21.

Fig. 20 is a view in transverse section on the line 20, 20, Fig. 19, looking in the direction of the arrows.

Fig. 21 is a broken detail view in elevation, parts in section, on the line 21, 21, Fig. 19, looking in the direction of the arrows.

Fig. 22 is a broken detail view in section on the line 22, 22, Fig. 20, looking in the direction of the arrows.

Fig. 23 is a diagrammatic view in plan of a car showing the application thereto of indicating devices for use in a multiple unit door control system embodying our invention.

Fig. 24 is a broken detail view in vertical transverse section on the line 24, 24, Fig. 23.

Fig. 25 is a fragmentary detail in side elevation showing the manner of operating the indicating device by the door movements.

Fig. 26 is a broken detail view in vertical transverse section on the same plane as Fig. 24, showing the indicator mechanism on a somewhat larger scale.

Fig. 27 is a similar view in horizontal section on the line 27, 27, Fig. 26, looking in the direction of the arrows.

Fig. 28 is a view similar to Fig. 26 showing a slightly different structure of indicating mechanism, the indicator being shown in display position.

Fig. 29 is a view similar to Fig. 28 showing the position of the indicator when the door is closed.

Fig. 30 is a fragmentary view in elevation showing the structure of Figs. 28 and 29, in the position occupied when the door is closed.

Fig. 31 is a similar view of the same showing the position of the parts when the door is open.

Fig. 32 is a digrammatic view in top plan of the proximate ends of adjacent cars showing an arrangement of platform support for the operator at a control station of the multiple unit car door control system of our invention.

Fig. 33 is a view in side elevation of the construction shown in Fig. 32.

Figure 34:
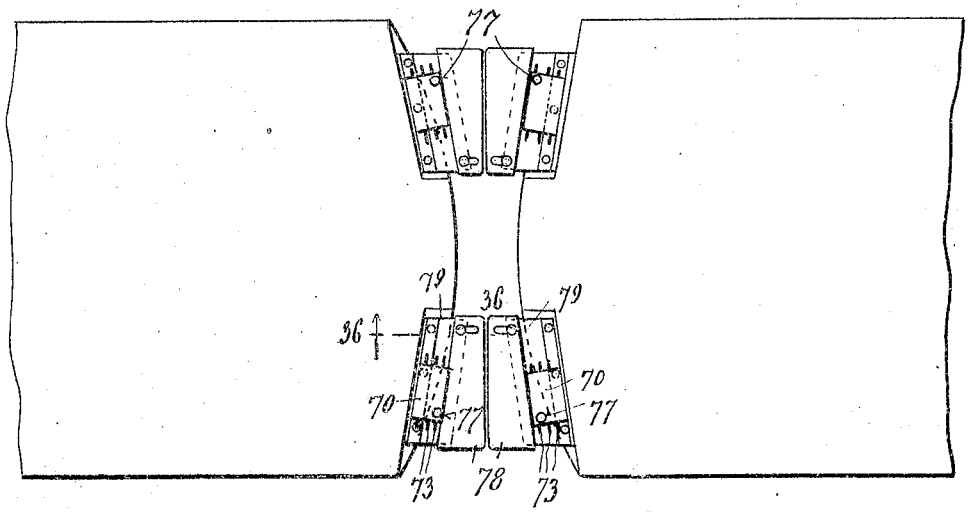

Fig. 34 is a view similar to Fig. 32 showing a modified support or section platform for the operator.

Figure 35:
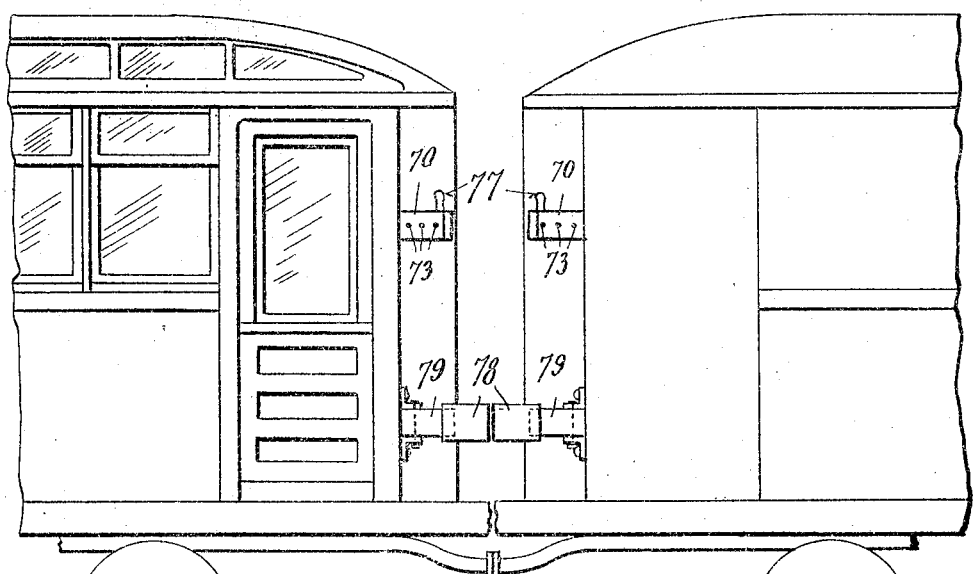

Fig. 35 is a side elevation of the same.

Figure 36:
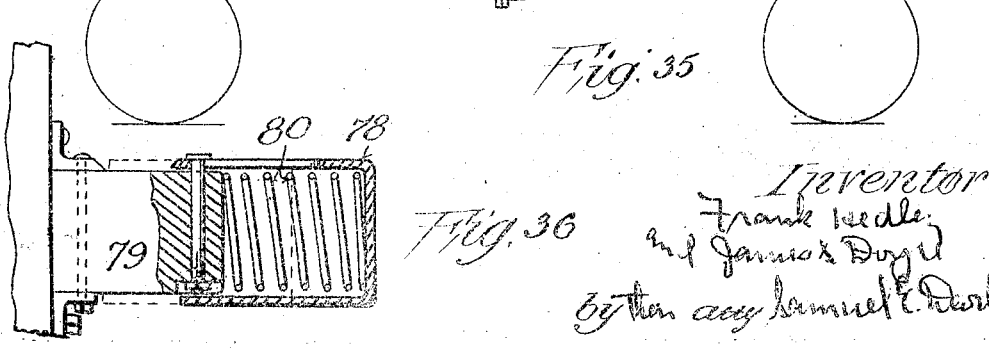

Fig. 36 is a broken detail view in vertical section on the line 36, 36, Fig. 34.

The same part is designated by the same reference sign wherever it occurs throughout the several views.

The expeditious and economical operation of subway, elevated and other car systems, and the handling of the boarding and alighting of passengers with speed and safety, and particularly where the traffic is heavy and congested, has become a serious problem in the larger cities where such systems are in use, and constant effort is being made to reduce the cost and operation of such systems, and to secure expedition and rapid transit with increased safety to the passengers carried. Among the modern practices it is customary to employ doors in the sides of the cars, usually one at each end and one or more intermediate the ends and on each side of each car, and to employ power operated devices to open and close the doors. According to present practice the control of the door operating motors on each car is accomplished by one or more guards stationed at a convenient point on the car, some times at the ends of the car and sometimes at or adjacent one of the center or middle car doors. This necessitates the employment of at least one guard or operator upon each car and where constantly increasing traffic necessitates increasing the number of cars in a train the cost incident to the employment of a guard or operator on each car becomes a greater burden on the management of the system. It is fundamentally one of the purposes of our present invention to provide a system of door control in which only one operator or guard is required to effect the control of all the doors on two or more cars of a train, such control being effected from any suitable or convenient point or station, whether on a car of the train, or from the platforms at passenger stations of the system, and whether with or without selectivity of the particular car or cars of the train, and with or without selectivity as to the particular door on a car. It is also fundamentally a purpose of our invention to provide a door control system of the multiple unit character, that is, any car may be detached from or added to a train without affecting the control of the doors thereon, in case it is detached from the train, and which enters at once into the scheme of door control of the train if added to the train, and wherein the various cars of the train in multiple units are organized into the system of door control of the train by the simple act of properly coupling up the cars into a train.

In connection with such a system of multiple unit car door control we propose to employ various auxiliaries and accessories for added safety and speed of operation, such, for example, as indicating devices or tell-tales, visible to the guard or operator, whether from a point inside the car or from a point outside the car to indicate at the door control station whether the doors of the cars, in the multiple of cars controlled from such station, or any one or more of such doors, are open or closed.

We also propose to provide the guards or operators on the cars with stations or platform supports which not only afford a control station for the doors of the cars in the group or multiple controlled from such point, but also a point or station of vantage from which the guard or operator may observe the movements of passengers and conditions of traffic in connection with his proper, efficient and safe control of the doors.

In carrying out our invention we have shown in Figs. 15, 16, 17 and 18, various illustrative types of door operating motors and controls therefor which are suitable for use in connection with a multiple unit car door control system embodying the principles of our invention, although we wish it to be understood that our invention is in no manner to be limited or restricted with respect to the type or structure of door operating motor to be employed, nor with respect to the particular means for controlling the operations of the motors. The type of motor and motor control means shown for illustrative purposes in Figs. 15, 16 and 17, consists of a power cylinder 40, to which compressed air is supplied from any convenient source through pressure supply pipe 41. The supply and exhaust of the pressure medium to and from the respective ends of the cylinder to effect a power operation of the door both in its opening and in its closing movements, is controlled, in this instance, by a valve device indicated at 42, including a valve operating arm 43, suitably connected to the rod 44 of a piston 45, operating in a small auxiliary cylinder 46, and normally held in one limit of its movement as by means of a spring 47. A port or passage 48 opens into the cylinder 46 on the opposite side of the piston 45, and valves 49, 50, respectively control the supply and exhaust of pressure medium to and from said passage or port from a pressure supply connection 41, and through an exhaust port 51. The valves 49, 50 are controlled by a solenoid or magnet 52, the terminals of the coils of which are indicated at 53, 54. The operation of the motor effects the operation of a lever 55, which is connected to the door in the usual or any well known manner. In a multiple unit door control system embodying our present invention the circuits of the magnet or solenoid coils 52 are controlled from the control point or station, it being understood that a door operating motor is employed to effect the operation of each door.

In the arrangement above described when the magnet circuit is energized the passage 48 is opened to pressure supply and closed to exhaust thereby operating the piston 45 towards the left as shown in Fig. 17, against the spring 47, and hence operating the motor valve device 42 to cause the motor to operate the door in one direction, say to open position. When the circuit of magnet 52 is opened the passage 48 is closed to pressure supply and opened to exhaust whereupon the spring 47 operates the valve towards the right to operate the motor valve to cause the door to be closed.

It will be observed that in this arrangement a single magnet is employed to control both the door opening and the door closing operations. Our invention, however, is not to be limited or restricted in this respect. For example, we have shown two control magnets 56, 57, in Fig. 18, one for controlling the closing movements of the door and the other the opening movements thereof. In this case the magnets control the main motor valve in the usual and now well known manner, and the circuits of said magnets are controlled in accordance with the principles of the multiple unit car door control of our inventions.

Other forms and types of motors and motor control means may be equally well adapted for use in carrying out our invention.

It may sometimes occur that the doors, or some particular door of a car may be opened or closed by hand. In such case, where a follow up device is employed to insure a completion of the door movement, it is desirable that provision be made to compel the completion of the door movement independently of the follow up device. Such an arrangement is shown in Figs. 19, 20, 21 and 22, wherein the circuit of, say, the door closing magnet 56 (Fig. 18) includes conductor rods 58, 59, carried in a frame or box 60, and spaced apart from each other. A conductor member 61 is employed to bridge the space between the rods 58, 59. This member is mounted upon a rod 61', and is normally held out of contact with the conductors 58, 59, by means of a spring 62. To the end of the rod 61' is pivotally connected a link 63, to which is pivoted a dog 64. The heel 65 of the dog engages the link 63, while the toe 66 thereof extends into the path of a lug or projection 67 on the door operating lever 55, so that, for example, as the door closes the lug 67 will engage and rock the dog 64, thereby rocking link 63, as indicated in dotted lines in Fig. 21, and hence pulling on rod 61', against the action of spring 62, and causing the conductor member 61 to bridge the space between rods 58, 59. This completes the circuit of, say, the closing magnet, and hence insures the follow up of the motor to the closed position of the door; should the latter be actuated towards closed position by hand this auxiliary and automatic closing of the magnet circuit is only momentary as the door operating lever 55 wipes by the dog 64, but this is sufficient to secure the proper control and operation of the main door operating motor. The instant the door lever passes by the dog 64 the spring 62 carries the member 61 out of bridging relation with respect to the conductors 58 and 59. The member 61 is of course insulated from rod 61', as indicated at 68, Fig. 22, and a light spring 69 serves to steady the said member in its operation.

Before entering upon a description of the various circuit arrangements shown as embodiments of our principles of multiple unit car door control system, we will describe certain other mechanical features employed in connection with our invention.

At the control station or point from which the various door movements are to be controlled, we locate a control box 70, see Figs. 11, 12, 13, 33, 35, within which are located a series of pairs of contacts 71, and cooperating bridging contacts 72. The latter are carried on rods 73 which extend through the ends of box 70 and springs 73 operate to maintain the bridge members 72 normally retracted out of engagement with their cooperating contacts 71. By pressing on the projecting ends of rods 73, or any one or more of them, circuit is completed between the two circuit wires 74, 75.

While we have shown and described one particular form and construction of control switch box it will be understood that our invention is not to be limited or restricted in this respect as obviously many other forms of switch devices may well answer the purpose. That shown and above described as illustrative of the principles involved is more particularly suitable for selectivity as to the particular door on a car to be operated, and has proven in actual practice to be well suited for such work.

As above mentioned the control point or station may be located at any convenient place, whether on the train or on a landing platform at a passenger station. In the arrangement shown as illustrative of the principles of our invention we locate the control station on the cars or train, and between the proximate ends of adjacent cars of the train, from which point the doors on one or more cars of the train in either direction from the control station may be controlled. In accordance with the principles of multiple unit control of the car doors we prefer to equip and locate a control box on each side of both ends of each car, so that in whatever manner the cars may be coupled up into a train a station from which the doors of two or more cars of the train may be controlled will be located at each end of the car.

In practice we also prefer to locate at the control station a step or standing platform for the guard or operator, and, in carrying out the principles of multiple unit control we locate such a standing platform on each side of both ends of each car.

In the form shown in Figs. 32 and 33, the control station supports or standing platforms are in the form of plates or brackets 76 secured to the ends of the cars, one on each side and on the outer surfaces thereof, and in convenient relation with respect to the control boxes 70, to enable a guard or operator to stand on the platforms and manipulate the switches in the associated control boxes. The supporting platforms 76 are shown raised above the level of the floors of the cars and their end vestibules or platforms, thereby enabling a guard to observe from an elevation the traffic conditions and boarding and alighting movements of passengers in the neighborhood of doors remote from his position not only down through the centers of the cars, but also on the landing or passenger station platform outside the cars or train. In order to aid the guard in safely maintaining his position while observing the passenger traffic and movements on the station platforms at which a train may be standing, the control boxes 70 are equipped with grabs 77, located near the outer ends of the control boxes, which may be grasped by the guard so as to permit him to lean outwardly beyond the side of the train while standing on the supports 76. The grabs 77 are so positioned that while grasped by the guard he may conveniently manipulate with the fingers the push buttons or rods 73 of the control box.

In Figs. 34, 35 and 36, a telescopic structure of guard platform is shown at 78, which telescope over knees or brackets 79, being yieldingly pressed outwardly by springs 80. This arrangement increases the effective area of the observation platform of the guard while at the same time permitting relative turning of the car ends while traversing curves.

It is obvious that other forms of observation platforms might be employed but those shown have proven satisfactory for the purpose in practical use.

In a system of multiple unit door control for cars in a train it is desirable to indicate whether or not the doors to be controlled which are of necessity located more or less remotely from the control point, are open or closed, so as to enable the guard or operator to determine when or whether or not to give any starting signal to the motorman at the front end of the train, and when, and if so, which one or more of the doors under his control remain to be operated, according to the traffic conditions existing at the moment in the vicinity of the doors. And it is desirable that such indications be effected inside the cars of the train as well as outside. In Figs. 23 to 31, we have shown illustrative signal or indicating means which have been found simple and effective in actual use, but our invention is not to be limited or restricted to the particular forms shown.

As in the diagram in Fig. 23, we locate a signal or indicating device 80 at each door on each car of the train. In practice the indicating devices are normally maintained in retracted position when their associated doors are closed but when any door is open its associated indicating device is coincidently actuated into display position.

In Figs. 24, 25, 26 and 27, one arrangement of indicating means is shown wherein a rock shaft 81 is journaled in hangers adjacent each door, and extends transversely partway across the car and carries a telltale or indicator 82, at its inner end. The outer end of shaft 81 is cranked and the crank end 83 projects across the path of movement of the front edge of the door in closing, so that as the door closes it encounters the crank arm 83 and rocks shaft 81, thereby rocking the interior indicating device 82 out of display position. In this arrangement the indicator device 82 is weighted at one end, as indicated at 84, so as to graviate into display position, when and as the door opens. Suitably hinged to the car framing 85, is an indicating flap 86 which is normally held by a spring 87 in position for one portion to project outwardly beyond the side of the car, and another portion to project inwardly across the path of movement of the front edge of the door in closing, whereby, as the door closes the flap is engaged and rocked into position parallel with the side of the car, this being its retracted position. But when and as the door opens the flap swings out into display position exteriorly of the car.

In Figs. 28 to 31 we have shown a slightly different arrangement of indicator means wherein a rock shaft 88 extends transversely partway across the car and carries a weighted indicator at its inner end, similar to that above described. The other end of shaft 88 is cranked, as at 89, and the cranked end projects beyond the side of the car and carries an indicating device 90. The cranked portion of the shaft 88 extends across the path of the front edge of the door in closing so that when the door closes the shaft 88 is rocked to position to withdraw both indicating devices 82, 90, from display position, but as the doors open the indicators automatically move into display position.

Other forms of indicators may be used, the essential features being that they shall be visible at a distance, whether located inside or outside of the cars, and must be actuated coincidently with the movements of the doors into display position when the doors are open and into withdrawn or retracted position when the doors are closed.

Indicating devices possessing these characteristics are important adjuncts to a multiple unit control system embodying the principles of our invention since by their use a guard or door control operator located at the door control point can readily ascertain whether any door of a car two or three or more removed from his control point in the train is open or closed.

Having now set forth, shown and described various mechanical features employed in conjunction and cooperation with a multiple unit car door control system embodying our invention, and which, in the fundamental characteristics thereof contribute to the practical successful, safe and economical practice and employment of our invention, we will now describe various circuit arrangements embodying the broad principles of our invention.

It is to be understood that cars ordinarily are provided with end and intermediate doors on both sides thereof, and in the practical operation of transportation systems such as subways, elevated, and the like it is frequently necessary to operate the doors on one side of the car or cars of a train for one or more passenger stations, and those upon the other side of the car or cars at one or more other passenger stations in the course of a trip over the prescribed route of the system. This renders it desirable to provide for the control of the operation of the doors on both sides of each car in the multiple unit door control system of our invention. In the wiring diagrams of various operative embodiments of our invention which we will now describe we have shown, for the most part, and to avoid complication of the drawings, the circuit arrangement for the door operation on one side only of the cars. But we desire it to be understood that, in such cases, the wiring arrangement shown is to be duplicated on the opposite side of the cars.

Referring particularly to Figs. 1 and 2, we have shown a train of four cars A, with a control station B, located between the proximate ends of the two pairs of the cars in the train, from each of which stations all the doors of the two adjacent cars are controlled. The circuit arrangement shown in Fig. 2 for accomplishing the control of the doors on that side of the cars is exceedingly simple, and in this three doors are employed on each side of each car, namely, a door at each end and one at the centre of the car, so that at each door control station, six doors are controlled by the guard or operator, three on one car and three on the adjacent car. Since the wiring arrangement is the same on each car a description of that on one car will suffice.

The purpose, of course, is to control the circuits of the various magnets 52, in this case, which, as above explained, control the opening and closing operations of the door moving motors.

The current required for the circuits of the motor control magnets 52 may be derived from any desired or convenient source. For the purposes of illustration we have shown a battery 91. From one terminal of the current source leads a conductor 92, to a wire 92 extending to the control boxes, indicated generally at 70, at each end of the car, and a bridging contact member 94, when in one position, (see the right hand end of the right hand car A of Fig. 2), serves to bridge the space between contacts 95, 96, and in another position, see the left hand end of the same car, said member bridges the space between contacts 97, 98. The contacts 95 at opposite ends of the car are connected together by wire 99. The contact 98 at each end of the car is in electrical communication with contacts 100, 101 and 102 of the control box 70 at the same end of the car. These contacts are arranged, under the control of the guard or operator at the control station, to cooperate with contacts 103, 104, 105, respectively. The contacts 103, 104 and 105 at each end of the car are connected to corresponding contacts at the other end of the car by wires 106, 107 and 108 respectively. The wires 106, 107 and 108, are respectively connected to the circuit wires 109, 110, 111 of the right hand end, the center and the left hand end door operating motor control magnets 52 on one side of the car selected for description of the wiring and thence to ground or return at 112. We have thus described the circuit connections for the control of the doors on one side of the car. In like manner current is supplied from the same current source 91, through contacts 98 at each end of the car, through wire 113, to contacts 114 which form part of the control system for the doors on the opposite side of the car, illustration of the remaining part of the wiring therefor being omitted to avoid confusion. The contacts 114, of course, correspond in purpose, function and operation to the contacts 100, 101 and 102.

The operation is exceedingly simple. The guard or operator occupying the control station B between the two cars under his control, with one hand manipulates the push buttons, push rods or other devices employed to close the circuits between contacts 100, 101, 102, and their respectively cooperating contacts 103, 104, 105. With his other hand he manipulates the closure of the circuits in the control box of the other car under his control. The pairs of contacts 100, 103; 101, 104; 102, 105; may be closed simultaneously by the operators, or successively, or in any other desired order, thus securing selectivity of the particular door to be operated. Thus, suppose the contacts 100, 103 be closed; thereupon circuit is completed from current source 91, through wire 92, wire 93, member 94, at the right hand end of the car, as illustrated, wire 99, wire 115, contact 97 at left hand end of car, member 94, contact 98, contacts 100, 103, wire 106, wire 109, control magnet 52 for the door operating motor for the right hand end car door to ground or return. In like manner, the closing of contacts 101, 104 completes the circuit 110 through the control magnet of the motor which operates the center door, and closing of the contacts 102, 105, closes the circuit 111, through the control magnet of the motor which operates the left hand end side door of the car.

With this arrangement a single control magnet is employed for both the opening and closing operations of each door actuating motor. Also, with this arrangement all the doors on the side of the car may be operated simultaneously or separately, according to the selection and control of the operator.

The principles of multiple unit car door control embodying our invention are applicable to simultaneous operation of all the doors on the same side of a plurality of cars in a train from a single control station. A wiring arrangement for accomplishing this application of our invention is shown in Fig. 4 as employed for the doors on the same side of a number of cars, the selection of the particular car on which the doors are to be simultaneously operated being under the control of the operator or guard. In this case, the control station is located at C, at which station are located control switches 116, 117, 118. Of course, in a multiple unit control system the equipment is the same on each car but for purposes of explanation of our invention, we will describe the arrangement for control from the station C, understanding, of course, that this station may be located on any car of the train. The switch 116 controls circuit connections to wire 119 which is a train wire and extends through one or more cars of the train to the left of the control station C to supply current to the motor control magnets of said cars. The switch 117 controls circuit connection to wire 120, wire 121, and the wires 122, 123, 124 of the motor control magnets 52 on the same car on which the control station C is located, and thence to ground or return at 112. The switch 118 controls circuit connections to train wire 125 and switch devices on one or more cars of the train to the right of the control station and through the various motor control magnets of said cars. Located at the central station and at each switch device on each car is a member 126, which, in one position, that of the control station C, for example, bridges the contacts 127, 128, the latter being in electrical communication through wire 129, with the contacts controlled by switches 116, 117, 118, while contact 127 is connected through conductor 133 to a source of current supply or trolley. In another position, that shown in the other cars included in the control system, the member 126, bridges the contacts 130, 131, 132.

The operation of this system is as follows, assuming the members 126 to be in their respective positions as shown. When control switch 116 at the control station is closed current is supplied from trolley or current source through wire 133, to contact 127, member 126, contact 128, wire 129, switch 116, wire 119, to the car or cars ahead of or to the left of the control station, the members 126, successively, on said cars, at each of which the current divides, part continuing on in succession through the next car and part going through the motor control magnets 52 on the same car therewith. When switch 117 is closed then, as above explained, current is supplied from trolley, through switch 117, wire 120, 121, 122, 123, and 124 of the door operating motor control magnets 52 on the same car with the control station. When switch 118 is closed, current is supplied from current sources through train wires 125, to the members 126 on the various cars to the right of the control station C, at each of which members 126 the current divides, part going on through train wire 125 to the member 126 on the next car and so on, and part through the door operating motor control magnets of the same car therewith.

Thus we secure a simultaneous operation of all the doors on one side of any desired number of cars in a train from the control station, with selectivity as to the various groups of cars controlled from such station, employing a single train wire for the operation of all the doors on the same sides of the various cars composing the groups under control.

We have illustrated the circuit arrangement for the doors on one side only of the various cars. The same arrangement is duplicated for control of the doors on the other side of the cars. It will also be understood that in a system of multiple unit car door control system a control switch 116, 117, 118 and their associated parts will be located on each car of the train, and preferably at each end of each car for the control of the door operations for each side of the cars.

In Fig. 3 we have shown an illustrative circuit arrangement for multiple unit control embodying the principles of our invention, wherein selectivity is accomplished as to the particular door to be operated from the control station, all of the selected doors being simultaneously operated. In this arrangement a control station D, for example is located at the end of one of the cars of a group or train, say the right-hand end car of the train. At this station is located the control box 70, containing the cooperating pairs of contacts 134, 135, 136, 137, 138 and 139. On each car means are employed to effect the proper working connections of the various circuits. For illustration of the principles involved, on each car, is a current source or trolley connection shown, for illustration, as a battery 91, from one terminal of which leads a conductor 140, to contacts 141, 142, respectively adapted for electrical connection with contacts 143, 144, according to the position of a cooperating bridging member 145. As shown in upper portion of Fig. 3 this member is bridging the contacts 142, 144. In the lower part of Fig.

3, the corresponding member is in neutral position. In other words, the contact members 145 are so placed as to complete circuit connection from current source to the control box at the station from which the door control is to be effected, whereas, on all the other cars included within the control group the contact members 145 are so placed that current is not supplied to the control boxes on these cars. This avoids the possibility of effecting door operation from any other except the control station by unauthorized tampering with the control boxes on the cars of the group other than that of the car on which the active control station is located. The contact 144 is connected by wire 146 to one member of each pair of contacts in the control box 70. The other members of the pairs of control box contacts 134, 135, 136, are respectively connected through wires 147, 148, 148ª, to train wires or conductors 149, 150, 151, each of which extends throughout the train or group of cars to be included within the control of station D. On each car the train wires 152, 153, 154, lead to contacts 155, 156, 157, respectively and which are adapted to be bridged to cooperating contacts 158, 159, 160. These latter contacts, in turn are connected by wires 161, 162, 163, respectively to car wires 167, 168, 169, of the door operating motor control magnets 52, and thence to ground or return. Each of the train wires 149, 150, 151 is connected to control box contacts at each end of the car, and likewise each of the car wires 164, 165, 166, is connected to one member of each pair of control box contacts 137, 138, 139, at each end of the car. These latter contacts are employed to control the door movements on the car on which the active control station is located. In this case the bridging contact members 300, are in their neutral position on the control car, that is, are not in bridging relation with respect to contacts 158, 155, 159, 156, 160, 157, as shown in the upper part of Fig. 3. In all the other cars in the group under control these bridging members 300 are in closed relation with respect to said contacts, as shown in the lower part of Fig. 3.

The operation of this arrangement is as follows, assuming the bridging contacts are in the positions shown, and that the control station is located at D. The guard at the control station closes the circuit through the pairs of contacts 134, for illustration. Thereupon circuit is completed from trolley or other current source 91, through wire 140, contact 142, bridge member 145, contact 144, wire 146, contacts 134, wire 147, train wire 149, throughout the train or number of cars to be included in the control system. On such car, except the control car, this train wire supplies current through wire 152, to contact 155, to contact 158, wire 161, car wire 164, wire 167 and magnet which controls the motor for operating one end door on one side of the car. Thus all the corresponding end doors throughout the multiple of cars under control from station D except the control car are simultaneously operated. In like manner, the closing of contacts 135 and 136, respectively complete the circuits of all the control magnets which control the operating motors for the center doors and the other end doors. The same results are attained with respect to the doors on the control car if the contacts 137, 138 and 139 are closed.

As before explained the wiring arrangement for operating the doors on only one side of the cars is shown to avoid confusion of illustration. It is also to be understood that a control box 70 is located at each side of each end of each car for a complete multiple unit door control system.

It may sometimes be desirable to effect a simultaneous operation of all the doors of a car, or of a group of any desired number of cars in a train, in their opening movements, and a selective control of the closing movements of the doors on individual cars of the train. Also in some systems of car door operation one magnet is employed to control the opening movements of the door operating motor, and another magnet controls the closing movements of said motor.

In Figs. 5, 5ª, we have illustrated a wiring arrangement for a multiple unit control system in accordance with our invention in which these features are provided for.

In this arrangement the control station may be located at any desired point or at either end of any car of the group to be controlled. For illustrating purposes we will suppose the control station is at E, at the left hand end of Fig. 5. At the control station is located a selective switch lever 170, which is connected to current source or trolley, as, for example, battery 171, through wire 172. This switch lever is operable into position to close circuit to any one, of a series of contacts a, b, c, d, e, f, g, h, i, j, k, each respectively connected to a train wire 173, 174, 175, 176, 177, 178, 179, 180, 181, 182, 183, extending throughout the train. On each car the train wire 173 is connected through wire 184, to a wire 185 and thence through the magnets 52, which control the closing movements of the door operating motor on that car. Thus, when circuit is closed from current source or trolley through switch lever 170 and contact point a, all the doors on one side of the cars throughout the train will simultaneously be actuated to their open position.

Now, in order to selectively control the door closing operation, a switch device indicated generally at F, is located on each car, and each switch device F is designed to be set in accordance with any desired predetermined order or arrangement of cars in the make up of the train. For example, the first car of the train may be designated car No. 1, and the switch device F on that car may be set to position for contact to be made at 186. Similarly, on car No. 2 the switch device is set to complete a contact at 187; car No. 3 at 188, and so on throughout the train. Each switch device F is in position to constantly close contact at 189, at whatever position the switch device may be set. The contact at 189 on each car is in circuit with whichever contact 186, 187, 188 etc. that may be closed on that car, and also, with a car wire 190, to which is connected the circuits of the magnets for controlling the closing movements of the door operating motors on that car.

With the arrangement thus described, and with the switches and switch devices in the positions shown it will be readily understood that when circuit is closed, for example, between switch lever 170 and contact $k$, current is supplied to the door closing magnets 52 on car No. 1 from current source through wire 172, lever 170, contact $k$, wire 183, wire 191, contact 186, switch device F, contact 189, wire 190 and the door closing magnets 52. It will thus be seen that only the doors of car No. 1 will be closed. If, however, the lever 170 closes contact at $j$, then current is supplied to the magnets which control the closing movements of the doors on car No. 2, and no other car and so on throughout the entire system.

As in the arrangements before described, the control station may be located at any desired point, and at either end of any car. It may be convenient to equip each car with a rack indicated at 192, Figs. 8 and 9, to contain car indicating plates 193 for use in identifying the relative position of the car when coupled up in a train. These plates are housed in the casing 192, and when a particular indicating plate is withdrawn from the casing the withdrawal movement thereof may be utilized in any convenient manner to actuate the switch device F, on that car into position corresponding to the number on the indicating plate which has been withdrawn.

A simple arrangement of selector switch construction is shown in Figs. 6 and 7, wherein the switch arm 170 is mounted to turn laterally so as to pass over the various contacts $a$, $b$, $c$, etc., and also to rock into and out of contact with any desired one of said contacts.

In Fig. 10 we have illustrated another circuit arrangement embodying the principles of our invention wherein a control station may be located, for example, at the center of a ten car train, and all the cars of the train controlled from that station, the cars on one side of the control station forming one group and those on the other side forming another group, both groups being controlled from the same control station, and by a single guard or operator. In this arrangement we also employ one magnet to control the opening and one to control the closing movements of each door operating motor. According to this arrangement nine conductors are employed which extend throughout the train, or throughout the group of cars of the train which are subject to the same control operation. We will call the train wires or conductors, 200, 201, 202, 203, 204 car selector circuits, and we will call the train wires or conductors 205, 206, 207, 208 door selector circuits. Since there are ordinarily three doors or sets of doors on each side of each car, and in the case of two magnet controls for each door operating motor, one for the door opening operation and one for the door closing operation, there will be six door operating motors and twelve control magnets on each car, three motors and six magnets on one side and the same number on the opposite side. We have shown the control magnets on each car in groups of three each, one group 209, the door opening control magnets for the doors on one side of the car, another group 210, the door closing control magnets for the doors on the same side of the car, and other groups 211, 212, the door opening control and the door closing control magnets, respectively, for the other side of the car. The door selector circuits 205, 206, 207 and 208, control electric switches 213, 214, 215 and 216 on each car of the controlled group. In other words, when the switches are closed the door selector circuits are energized. For instance, switch 213 closes circuit from car selector conductor 200, through wire 217, switch 213, wire 218 and door opening magnets 209. In like manner switch 214 closes circuit from the same car selector conductor 200, through wire 219, switch 214, wire 220 and the door closing magnets 210 on the same car, and so on throughout the entire system. Consequently at the control station the guard or operator selects a car selector conductor and a door selector conductor and closes both to current source whereupon the selected door operation takes place on the selected car. For example, if the guard selects car selector circuit 200 and door selector circuit 206, and closes both to current source, then the door closing magnets 210 on one side of the car corresponding to the circuit 200 will be energized and none other throughout the train or group, thereby closing all the doors on the selected side of the selected car. Thus the guard or operator at the single control station is enabled to select any particular car out of a group of, say, five cars, and effect the control of either the opening or the closing operations on either side of the selected car from the control station. There will, of course, be as many car selector circuits as there are cars in a particular group or train to be controlled from the control station, but the door selector circuits remain the same in number whatever the number of cars in the group, there being two of such door selector circuits for the door operations on each side of the car, one for the closing and the other for the opening operations.

In Fig. 10ª we have shown a circuit arrangement for a multiple unit car door control system embodying the principles of our invention, wherein separate magnets are employed for the opening and closing movements of the doors, and wherein selectivity as to the doors to be operated is secured, and wherein the closing of the doors is insured by the use of the auxiliary switch device shown structurally in Figs. 19, 20, 21 and 22, and hereinabove described. In this arrangement two control magnets 52, 52ª, are used for each motor, one—52—for controlling the door closing movement and the other—52ª—for controlling the door opening movement of the motor. In this arrangement a cut-out switch 301 is used at each end of the car to control the supply of current from current source to the control boxes 70 at the respective ends of the car. Current source is indicated at 91 from one terminal of which a wire 302 connects to the car wire 303, which leads to contacts 304 at the ends of the car. The contacts 304 are adapted to be bridged by members 301 when in proper position to cooperating contacts 305, the one being connected by car wire 306 to contact 307 at the other end of the car while the other contact 305 is connected by car wire 308 to contact 309 at the other end of the car. The contacts 307, 309, are respectively adapted to be bridged by members 301 to cooperating contacts 310, 311, respectively connected by car wires 312, 313, to the control boxes at the respective ends of the car. Cooperating with the live wire thus connected to the control boxes 70 are contacts 314, 315, 316, which control the circuits of the door closing magnets 52, through wires 317, 318, 319, respectively, while other control box contacts 320, 321, 322, respectively control the circuits of the door opening magnets 52ª, through wires 323, 324, 325, respectively. Tapped off from the trolley or current supply wire 303 is a branch circuit 326, through the door closing magnet 52 of each door motor. In this branch circuit is located the auxiliary switch 327, which is shown in detail in Figs. 19, 20, 21, 22, and above described.

The operation of this arrangement of Fig. 10ª is as follows,—supposing the parts to be in their respective positions as shown, and the door control station to be located at D.

Now suppose the operator at station D closes contact 314 to wire 313, thereupon circuit is completed as follows: From current source 91, through wire 302, wire 303, contact 304, bridge 301, contact 305, wire 308, contact 309, bridge 301, contact 311, wire 313, contact 314, wire 319 and the left hand door closing magnet to ground. In like manner the circuits controlled by the other control box contacts 315, 316, may be traced through the closing magnets of the other motors on the same side of the car, while those controlled by the contacts 320, 321 and 322, lead through the respective door opening magnets 52ª, thus securing selectivity of the door operations, whether opening or closing, and since the closing movements of the door operating levers operate to close auxiliary switches 327, the closing of the doors is insured. In this arrangement a guard located between the proximate ends of adjacent cars controls all the doors on both cars.

In Fig. 10ᵇ we have shown another embodiment of our invention wherein simultaneous opening and closing of all the doors on one side of all the cars in the train or group of cars is effected with separate magnets controlling the opening and closing operations of each door actuating motor.

In this arrangement the control station D may be located at any desired point, at which station two contacts 330, 331, are employed to complete circuit from current source and supply wire 332, respectively through wires 333, 334, according to which contact is closed to train wires 335, 336, respectively. These train wires extend throughout the train or group of cars to be controlled and on each car a wire 337, 338 is tapped off therefrom to car wires 339, 340, which are respectively connected to the door closing magnets 52 and the door opening magnets 52ª on that car. Thus it will be seen that by simply closing switch 330 all the door closing magnets throughout the train will be energized, thereby simultaneously closing all the doors of the train, while by closing the switch 331, all the door opening magnets will be energized and hence all the doors of the train will be simultaneously opened.

Our invention may be carried out in many other control circuit arrangements, and therefore, while we have illustrated and described various arrangements for accomplishing the objects and purposes of our invention, we do not desire to be limited or restricted in the broadest scope of our invention to any particular or specifically detailed arrangement.

It will be seen that by the use of a control system for the doors of the cars of trains embodying our invention, we are enabled to accomplish the desired operation of trains with a very much decreased train force of employees. Since all the doors of two or more cars are under the control of a single guard or operator we are enabled to dispense with the services of from two to seven guards for trains of four to ten cars each. This involves an enormous economy in the practical operation of an extensive railway system such as the subway or elevated systems of large cities where many trains are operated daily over the systems. Moreover, we secure this great economy of operation without sacrificing anything of speed or safety to the travelling public. On the contrary both speed and safety of operation is increased by the employment of our control system as has been demonstrated by actual and practical operation of the same. In the first place speed of operation is increased since the losses of time due to the personal equation of a larger number of individual guards for the operation of the train according to former practices are eliminated. Again safety of operation is increased because the guard or operator having the control of the door operations is stationed in a more advantageous position to observe the boarding and alighting movements of passengers and is therefore better able to control the door operations with a view to avoiding accidents or injury to passengers at any point within his sphere or radius of control. By providing devices to readily indicate from remote points to the control station whether any particular door or any particular car is open or closed not only is the guard enabled to expedite the necessary control operations but the responsibility of safe and speedy operation is more centered and confined than if a separate guard is employed on each car.

We also provide a system of multiple unit car door control which enables cars to be coupled up in indiscriminate relation in making up a train and still effect a control of two or more cars of the train from either end of any car, or from any other desired point.

Having now set forth the objects and nature of our invention and various systems embodying the principles thereof, what we claim as new and useful and of our joint invention and desire to secure by Letters Patent is,—

1. In a multiple unit car door control system, the combination with a train of cars each having doors in the sides thereof, of means to control the operations of all the doors on either side at will of two or more cars of the train from the same control station.

2. In a multiple unit car door control system, the combination with a train of cars each having doors in the sides thereof, of means to control the operations of all the doors on either side at will of two or more cars of the train from the same control station on the train.

3. In a multiple unit car door control system, the combination with a train of cars each having doors in the sides thereof, of means to control the operations of all the doors on either side at will of two or more cars of the train in multiple units of the cars of the train.

4. In a multiple unit car door control system, the combination with a train of cars having doors in the sides thereof, and power operated devices for moving the doors, of means to control said power operated devices in multiple units of cars of the train from any one of said cars.

5. In a multiple unit car door control system, the combination with a train of cars having doors in the sides thereof, and power operated devices for moving the doors, of means to control said power operated devices in multiple units of cars of the train from a single control station on any selected car for each multiple.

6. In a multiple unit car door control system, the combination with a train of cars having doors in the sides thereof and power operated devices for moving the doors, of means to control said power operated devices in multiple units of cars of the train to simultaneously open the doors of each multiple.

7. In a multiple unit car door control system, the combination with a train of cars having doors in the sides thereof and power operated devices for moving the doors, of means to control said power operated devices in multiple units of cars of the train, and means to selectively determine the particular car of the multiple upon which the doors are to be operated from any predetermined car.

8. In a multiple unit car door control system, the combination with a train of cars having doors in the sides thereof, and power operated devices for moving the doors, of means to control said power operated devices in multiple units of cars of the train, and means to selectively determine the particular door or doors of the multiple to be operated.

9. In a multiple unit car door control system, the combination with a train of cars having doors, and a motor for moving each door, of means for controlling said motors from a single control station selectively with respect to the various cars.

10. In a multiple unit car door control system, the combination with a train of cars having doors, and a motor for moving each door, of means for controlling said motors in multiples of cars of the train selectively as to the cars of the multiple.

11. In a multiple unit car door control system, the combination with a train of cars having doors to be opened and closed, of an auxiliary platform at the end of each car of the train, and means located adjacent each auxiliary platform to control the operations of the said doors in multiple units of cars of the train.

12. In a multiple unit car door control system, the combination with a train of cars having doors to be opened and closed, of an auxiliary platform raised above the level of the floors of the cars, and means located adjacent said raised auxiliary platform to control the operations of the doors in multiple units.

13. In a multiple unit car door control system, the combination with a train of cars having doors to be opened and closed, and a motor for operating each door, of an auxiliary platform carried on the exterior of the end wall of one of the cars, and means located adjacent said auxiliary platform for controlling a plurality of said motors.

14. In a multiple unit car door control system, the combination with a train of cars having doors to be opened and closed, and a motor for operating each door, of a magnet for controlling each motor, circuits for said magnets, a control device for said circuits, and an auxiliary platform located adjacent said control device whereby a plurality of said magnets may be controlled by an operator stationed on said auxiliary platform.

15. In a multiple unit car door control system, the combination with a train of cars having doors to be opened and closed, and a motor for operating each door, of a magnet for controlling each motor, circuits for said magnets, a control device located at the end of each car of the train and connected to control the magnets on a plurality of the cars of the train, and a raised auxiliary platform located adjacent each control device.

16. In a multiple unit car door control system, the combination with a train of cars having doors to be opened and closed, and a motor for operating each door, of a magnet for controlling each motor, circuits for said magnets, a control device located at the end of each car of the train and connected to control the magnets on a plurality of the cars of the train, and a telescopic platform located adjacent each control device.

17. In a multiple unit car door control system, the combination with a train of cars having doors to be opened and closed, and a motor for operating each door, of a telescopic platform on one of the cars of the train, and means located adjacent said telescopic platform for controlling a plurality of said motors.

18. In a multiple unit car door control system, the combination with a train of cars having doors to be opened and closed, and a motor for operating each door, of a telescopic platform on one of the cars of the train, and means located adjacent said telescopic platform for controlling said motors in multiples of cars of the train.

19. In a multiple unit car door control system, the combination with a train of cars having doors to be opened and closed, and a motor for operating each door, of an observation platform secured to the exterior of the wall at each end of the car, and means located adjacent each observation platform to control the motors in multiple units of the cars of the train.

20. In a multiple unit car door control system, the combination with a train of cars having doors to be opened and closed, and a motor for operating each door, of means for controlling said motors in multiple units of cars of the train, and means controlled coincidently with the door movements for indicating whether the doors are open or closed.

21. In a multiple unit car door control system, the combination with a train of cars having doors to be opened and closed, and a motor for operating each door, of means for controlling a plurality of said motors from a single control station, and means controlled coincidently with the movements of each door to indicate whether said door is open or closed.

22. In a multiple unit car door control system, the combination with a train of cars having doors to be opened and closed, and a motor for operating each door, of means located on one of the cars of the train to form an elevated observation station, means located adjacent said station to control a plurality of said motors, and an indicating device for each door, said indicating devices being visible from said station and operated coincidently with the door movements to indicate whether the door is open or closed.

23. In a multiple unit car door control system, the combination with a train of cars having doors to be opened and closed, and an operating motor for each door, of a control magnet for each motor, a circuit for each magnet, a plurality of train conductors, a master switch to selectively connect any one of said train conductors to a current source, and a switch device on each car to connect the magnet circuits on said car to a corresponding train conductor.

24. In a multiple unit car door control system, the combination with a train of cars having doors to be opened and closed, and an operating motor for each door, of a control magnet for each motor, a circuit for each magnet, a plurality of train conductors, a master switch to selectively connect any one of said train conductors to a current source, and a switch device on each car to connect the magnet circuits on said car to the same train conductor to secure simultaneous operation of all the door motors to open the doors.

25. In a multiple unit car door control system, the combination with a train of cars having doors to be opened and closed, and an operating motor for each door, of a control magnet for each motor, a circuit for each magnet, a plurality of train conductors, a master switch to selectively connect any one of said train conductors to a current source, and a switch device on each car to connect the magnet circuits on said car to a corresponding train conductor, a car indicating device for each car, said indicating device when operated to display position also serving to set the car switch device to corresponding position.

26. In a multiple unit car door control system, the combination with a train of cars having doors to be opened and closed, and an operating motor for each door, of a control magnet for each motor, a circuit for each magnet, car selector train circuits and door selector train circuits, said door selector circuits operating to connect the car selector circuits to the magnet circuits on the various cars.

27. In a multiple unit car door control system, the combination with a train of cars having doors to be opened and closed, and an operating motor for each door, of a control magnet for each motor, a circuit for each magnet, car selector circuits corresponding to the number of cars in the group or multiple to be controlled, door selector circuits, and means arranged in said last named circuits to connect the respective car selector circuits to the magnet circuits of their respective cars.

28. In a multiple unit car door control system, the combination with a train of cars having doors to be opened and closed, and an operating motor for each door, of independent control magnets for the door opening and closing operations of said motors, the opening and closing magnets on each car being arranged in groups, a door selector circuit for each group of magnets, and means in each door selector circuit to complete the circuit of its group of magnets to its corresponding car selector circuit.

29. In a multiple unit car door control system the combination with a train of cars having doors to be opened and closed, and an operating motor for each door, of a control magnet for each motor, a circuit for each magnet, and means operated by the movement of each door to complete the circuit of its operating motor control magnet.

30. In a multiple unit car door control system, the combination with a train of cars having doors to be opened and closed, and an operating motor for each door, of a control magnet for each motor, a circuit for each magnet, a switch device to control the circuit of each magnet, and a trip device operated by the movement of each door to operate said switch device.

31. In a multiple unit car door control system, the combination with a train of cars having doors to be opened and closed, and an operating motor for each door, of a control magnet for each motor, a circuit for each magnet, a switch device to control the circuit of each magnet, a trip dog arranged to be engaged and actuated by the movement of the door, and spring tensioned means operated by said trip dog for closing said switch.

32. In a multiple unit car door control system, the combination with a train of cars and the doors therefor, and operating motors for the doors, of a magnet to control the opening and a magnet to control the closing movements of each motor, means for controlling said circuits, and means to automatically close the closing magnet circuits.

33. In a multiple unit car door control system, the combination with a train of cars and the doors therefor, and operating motors for the doors, of a magnet to control the opening and a magnet to control the closing movements of each motor, means for controlling said circuits, and means operated coincidently with the closing movements of each door to automatically close the circuit of its closing magnet.

34. In a train door-operating system, a sectional train-line, switches on each of the several cars normally connecting the sections of said train-line but movable to interrupt it on any car, a local door-operating circuit on each car normally connected to the train-line, and means for disconnecting said local door-operating circuit on any car from the train-line when the train-line is interrupted on the same car.

35. On a train door-operating system, a sectional train-line, switches on each of the several cars normally connecting the sections of each car but movable to interrupt the train-line on any car, a local door-operating circuit on each car normally connected to the train-line, means for disconnecting said local door-operating circuit from the train-line when the train-line is interrupted on said car, and means on the same car for connecting a source of current to the train-line and to the disconnected local door-operating circuit.

36. A train door system comprising operating magnets for the door engines, circuit control devices on each car, either of said devices controlling the same door engine magnet, and a train line having sections extending into the same car, and containing, respectively, the said circuit control devices.

37. In a door control system for a plurality of cars, the combination with the doors and operating motors therefor on each car, of a conductor extending from an intermediate car to the adjacent car at one end thereof, another conductor extending from the intermediate car to the adjacent car at the other end thereof, independent switch devices on an intermediate car respectively operating to connect said conductors to a current source, and means on each end car connected to said respective conductors to control the door operating motors on said end car.

38. In a door control system for a plurality of cars, the combination with the doors and operating motors therefor on each car, of a conductor extending from an intermediate car to the adjacent car at one end thereof, another conductor extending from an intermediate car to the adjacent car to the other end thereof, independent switch devices on the intermediate car respectively operating to connect said conductors to a current source, means on each end car connected to said respective conductors to control the door operating motors on said end cars, and an additional switch device on the intermediate car to control the door motors on said intermediate car.

39. In a door control system for a plurality of cars, each having doors and operating motors for said doors, a line conductor from an intermediate car to the adjacent car at one end thereof, a second line conductor from the intermediate car to the adjacent car at the other end thereof, a controller for each door motor on each car, the door motor controllers on the end cars being controlled by current supply in said respective conductors, and switch devices on the intermediate car respectively controlling current source connections to said line conductors, and a switch device also on the intermediate car to control current source connections to the door operating motors on the intermediate car.

40. In a multiple unit car door control system the combination with cars of a train arranged in groups of two or more cars each, doors for each car of each group, an operating motor for each door, and a control magnet for each motor, of means to independently control current supplied to the control magnets of each group of cars, and means to selectively control the supply of current to individual control magnets of a car of each group, and said current supply control means for two or more groups being located at a common point or station.

41. In a multiple unit car door control system, the combination with cars of a train arranged in groups of two or more cars each, doors for each car of each group, an operating motor for each door, and a control magnet for each motor, of a switch device to connect the circuits of the control magnets in each car to a current source, and switches to independently and selectively control the completion of the circuit to current source of each control magnet in each group of cars, the selective switches for two groups of cars being located at a common point or station.

42. In a multiple unit car door control system, the combination with cars of a train arranged in groups of two or more cars each, doors for each car of each group, an operating motor for each door, and a control magnet for each motor, of means to selectively control the circuits of the control magnets of each group of cars, the selective control of both groups being located at a common point or station.

43. In a multiple unit car door control system, the combination with cars of a train arranged in groups of two or more cars each, doors for each car of each group, an operating motor for each door, and a control magnet for each motor, of means to selectively control the circuits of the control magnets of each group of cars, the selective control of both groups being located at a common point or station, and means also located at the common point or station to independently control the circuits of the control magnets of the door operating motors on the same car with the common point or station.

44. In a train door operating system, a sectional train line, a switch on each of the several cars movable into and out of position to connect or to interrupt said train line, a local door operating circuit on each car, and means to connect said local circuit to the line circuit when said switch is in position to connect the sections of said line circuit.

45. In a train door operating system, a sectional train line, a switch on each of the several cars movable into and out of position to connect or to interrupt said train line, a local door operating circuit in each car, said switch operating when in position to connect the sections of the train line to also connect said local door operating circuit to the train line.

46. In a train door operating system, a sectional train line, a switch on each of the several cars, movable into and out of position to connect or to interrupt said train line, a local door operating circuit on each car, means to connect said local circuit to the line circuit when said switch is in position to connect the sections of said line circuit and means on a car of the train to control the connections of the respective train line sections to current supply when said switch is in position to interrupt the said train line on said car, and means to connect the local door operating circuit on said car to current supply.

47. In a train door operating system, a sectional train line, a switch on each of the several cars movable into and out of position to connect or interrupt said train line, a local door operating circuit on each car, means to connect said local circuit to the line circuit when said switch is in position to connect the sections of said line circuit, and means on a car of the train to connect to current source the local door operating circuit and either section of the train line.

48. In a train door operating system, a sectional train line, a switch on each of the several cars movable into and out of position to connect or to interrupt said train line, a local door operating circuit on each car, said switch operating when in position to connect the sections of the train line to also connect said local door operating circuit to the train line, and means on a car of the train to control the connections to current source of each section of the train line, and also the local door operating circuit on said car.

49. In a train door operating system having a control station on one of the cars of the train, train line conductor sections respectively extending from the control station to other cars of the train at opposite ends of the car having the control station, means on each of said other cars for preserving continuity of the train line conductor section thereon, each of said other cars having a local door operating circuit connected to said train line conductor, a local door operating circuit on the car having the control station, and means at the control station for controlling the connections to current source of the sections of train line conductors, and also of the local door operating circuit of the car having the control station.

50. In a train door control system the combination with a train line and door operating means controlled thereby on the several cars of the train, of local switch contacts for energizing said train line, associated switch contacts for separately operating doors on one car of the train, and a switch device for both sets of contacts.

51. In a train door control system the combination with a train line, door operating means on the several cars of the train, and electrical devices for controlling the door operating means, and operating when energized to cause the doors to move in one direction, and when deenergized to cause said doors to move in the other direction, and switch contacts on one car acting to energize said devices on that car, and to separately energize the devices on the other cars throughout said train line.

52. In a train door control system the combination with a train line, door operating means on the several cars of the train, and electrical devices for controlling the door operating means, of switch contacts on one car acting to control the circuit of said electrical devices on that car, and to separately control the circuits of said electrical devices on the other cars through said train line.

53. The combination with one car of a train having a door opening into the body of the car at one side thereof, of an operating motor for said door, a train line, switch devices in said train line on the respective cars of the train, door circuits controlled by said switch devices and on the one car aforesaid, a switch device at the said door for separately controlling the motor of that door and the train line leading to the other cars of the train.

54. The combination with one car of a train having a side door opening into the body of the car at the middle part thereof, of a switch at said door and a train line for operating doors on other cars of the train, said switch having contacts for controlling said train line, and also for independently controlling a door on the car where said switch is located.

55. The combination with one car of a train having a side door opening into the body of the car, of motors for the respective doors on the several cars of the train, a train wire, circuits for the several motors controlled by the train wire, switch contacts at the said side door for sectioning the train wire, and associated switch contacts for separately controlling the local doors on the said car and the doors on other cars of the train through said train wire.

In testimony whereof we have hereunto set our hands on this 24th day of June, A. D. 1919.

FRANK HEDLEY.
JAMES S. DOYLE.